Oct. 10, 1961  W. A. RINGLER  3,003,674
HINGED COVER BLANKS AND CARTONS
Filed March 8, 1954  10 Sheets-Sheet 3
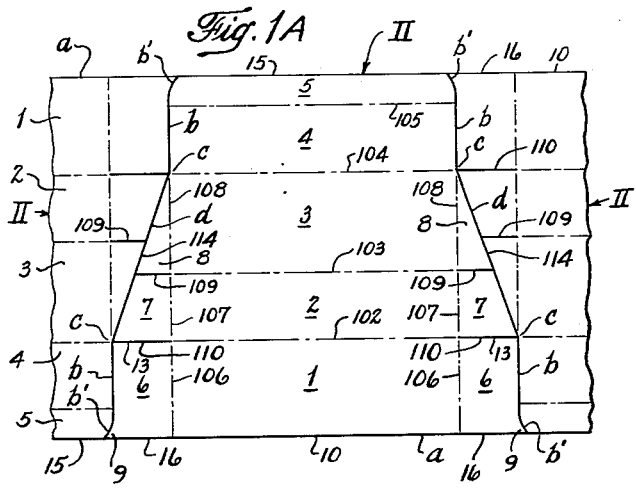
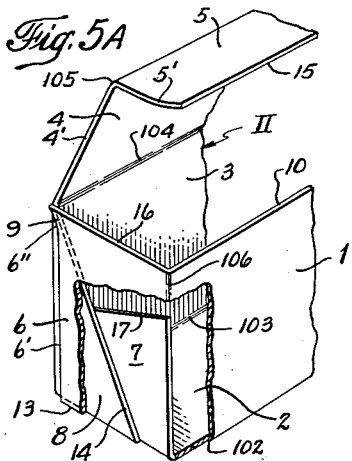
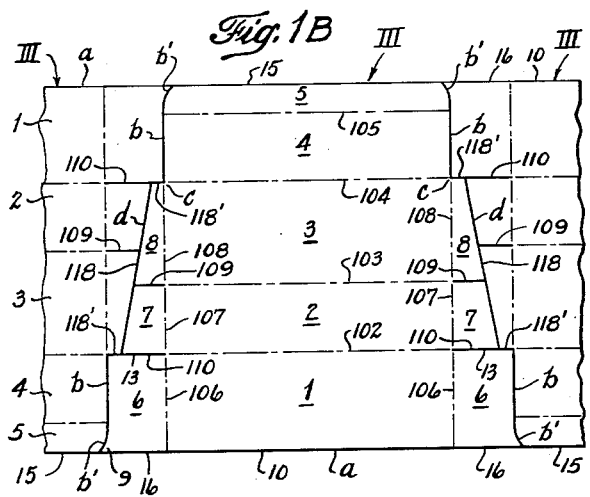
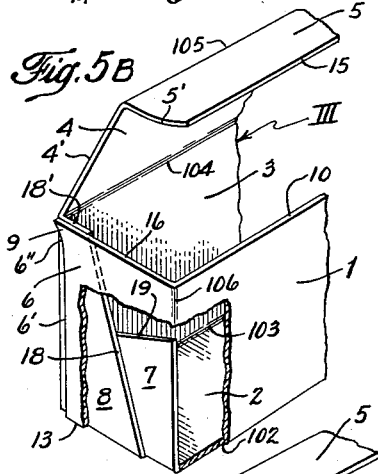
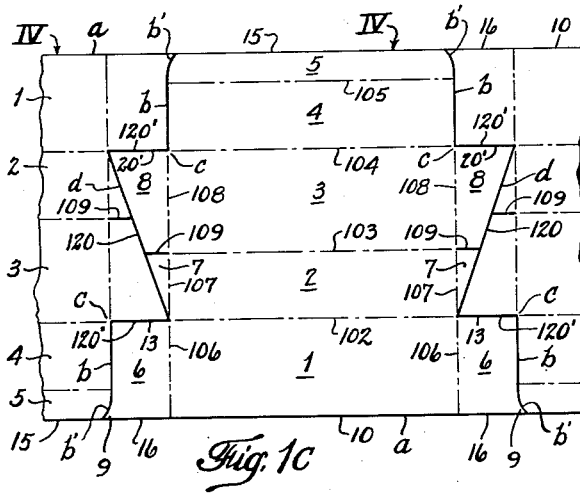
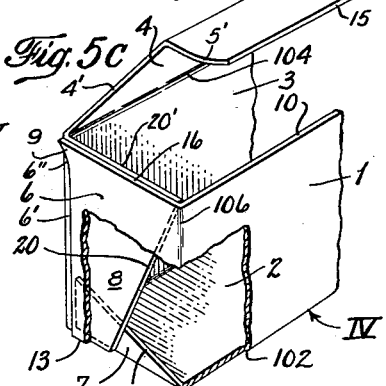
INVENTOR.
WILLIAM A. RINGLER
BY
ATTORNEY.

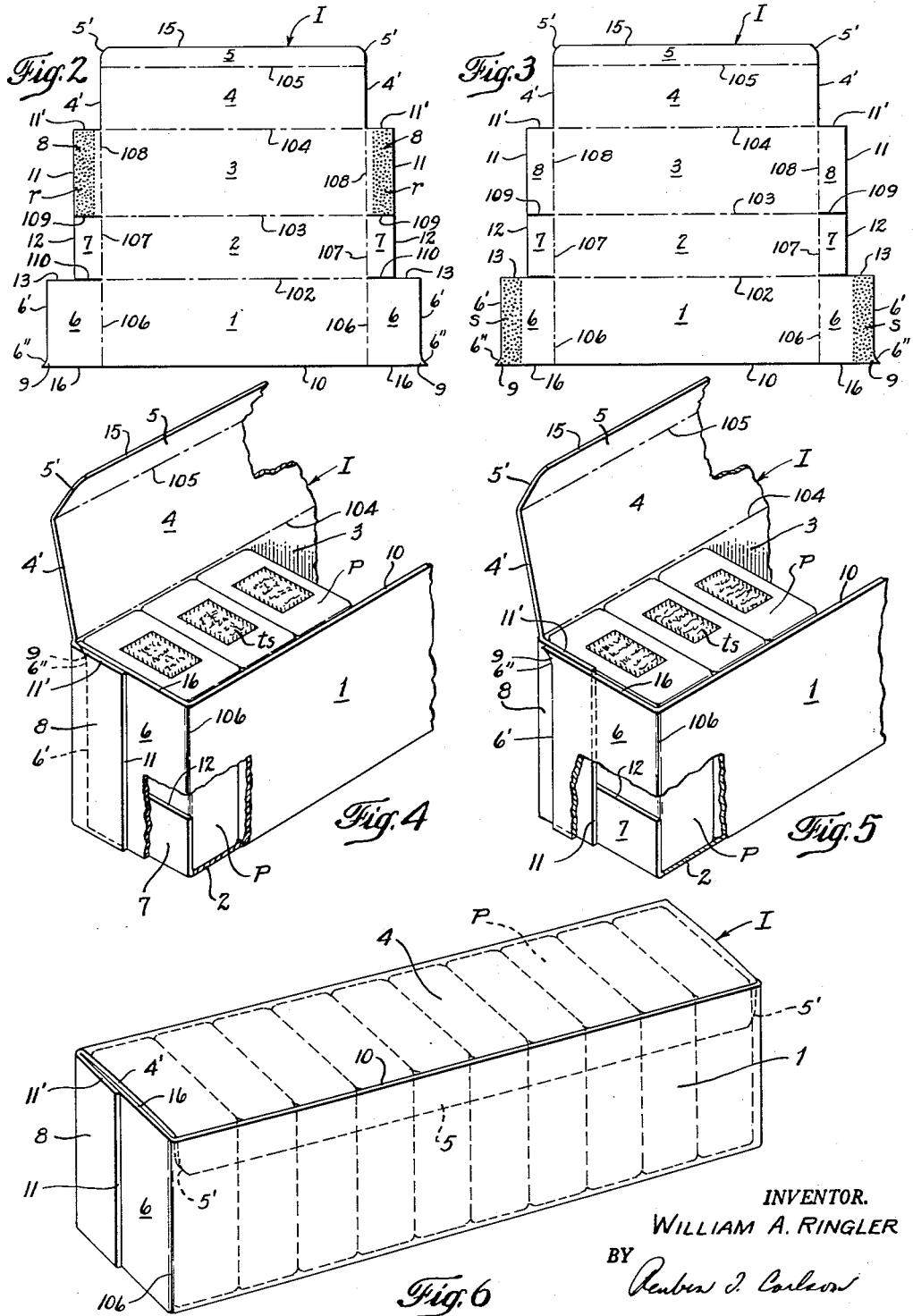

INVENTOR.
WILLIAM A. RINGLER
BY
ATTORNEY

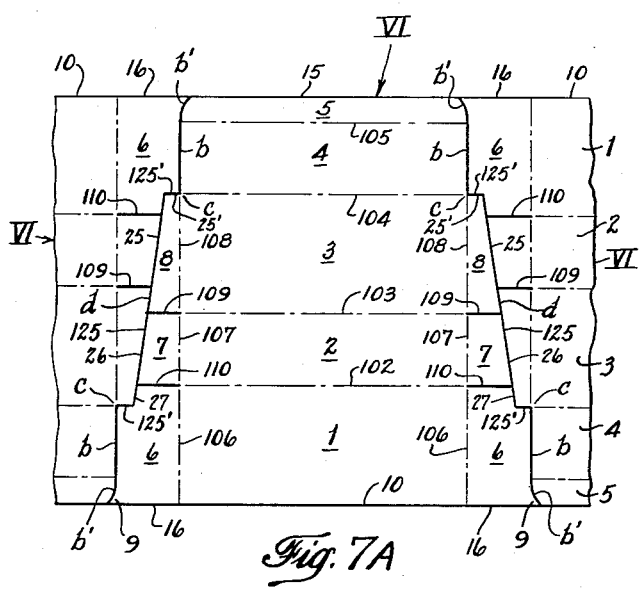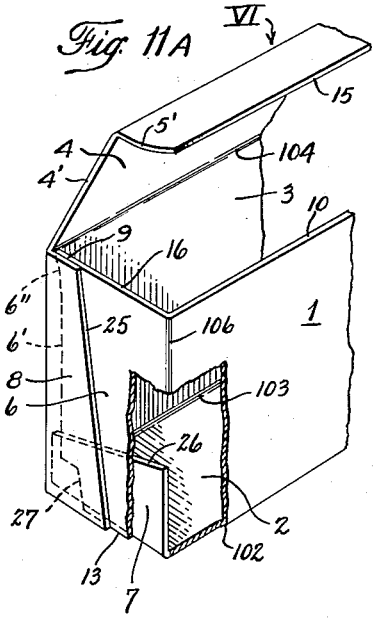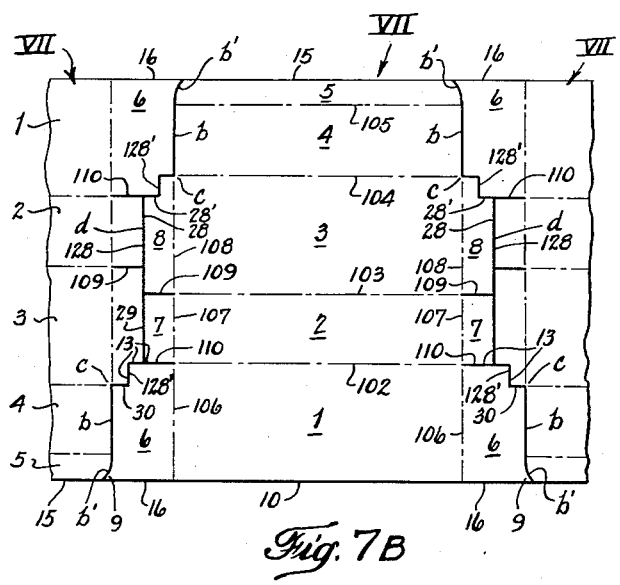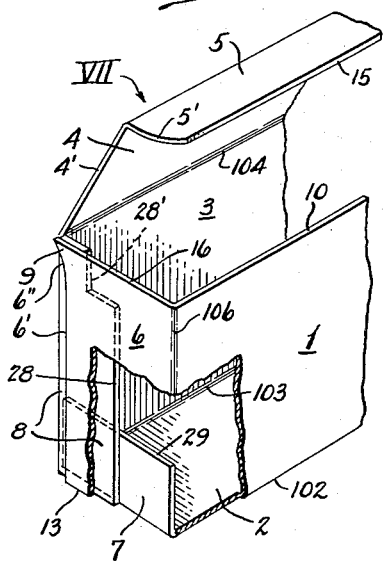
INVENTOR.
WILLIAM A. RINGLER
BY
ATTORNEY.

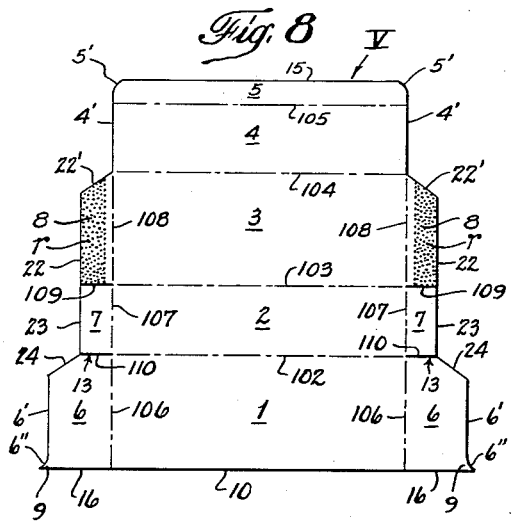
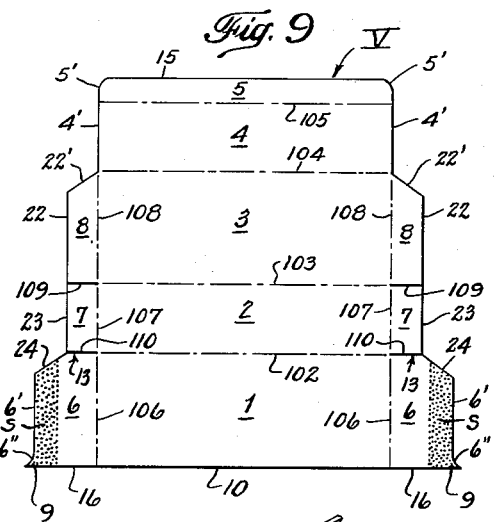
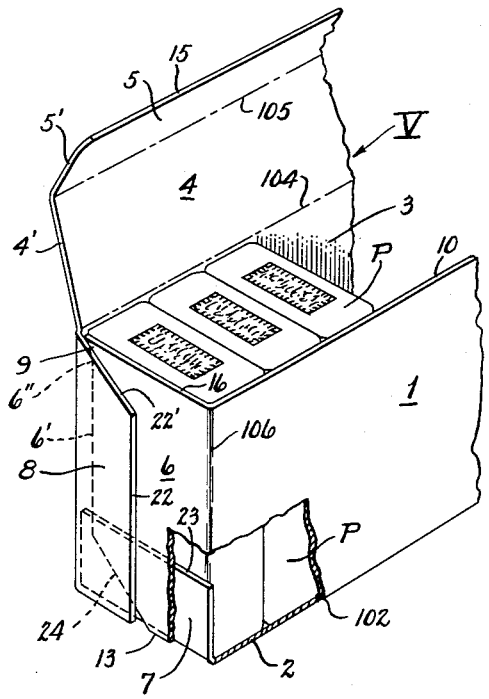
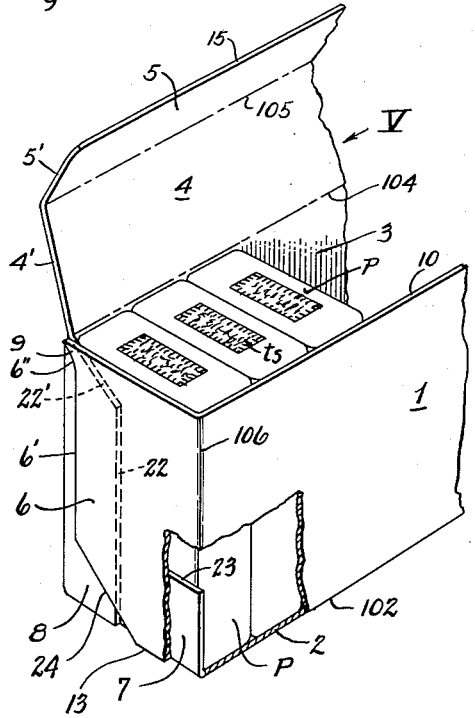
INVENTOR.
WILLIAM A. RINGLER
BY
ATTORNEY.

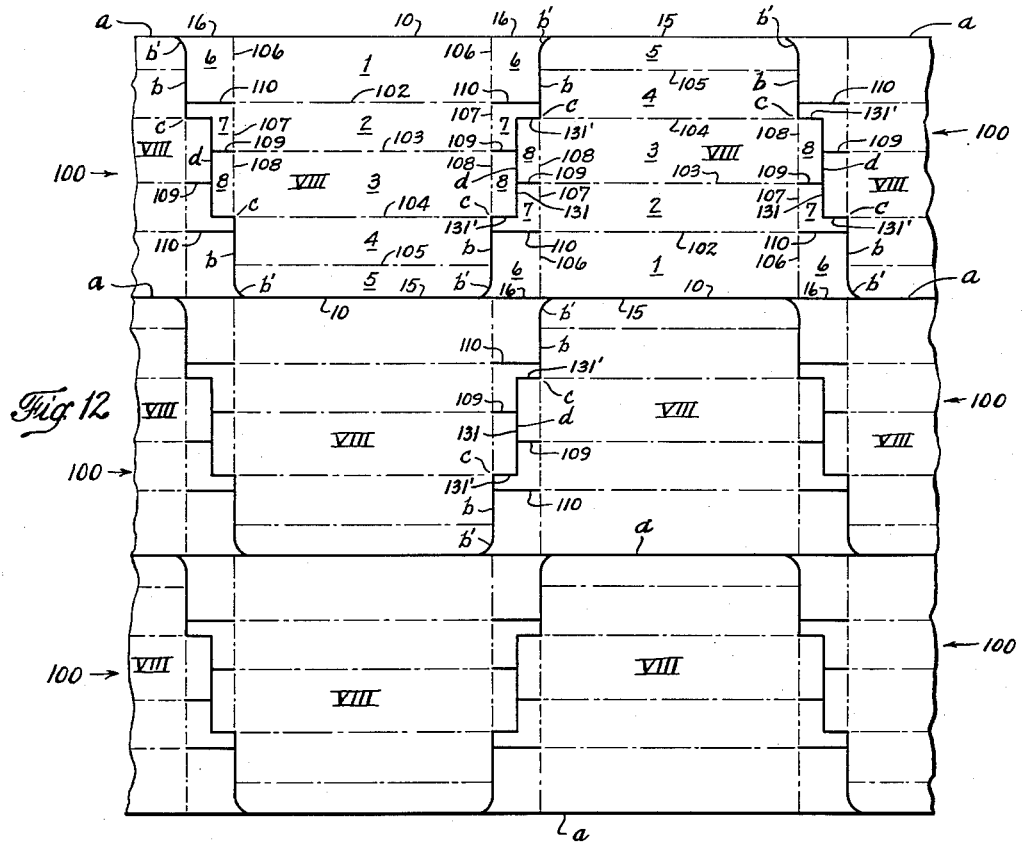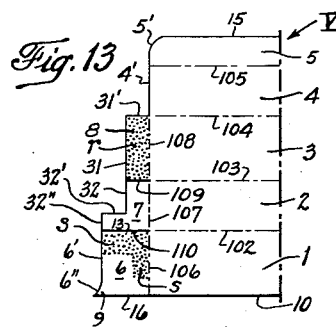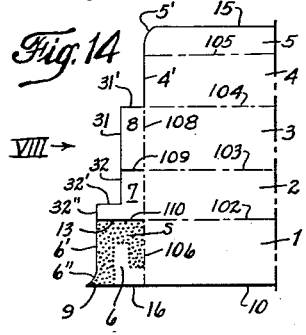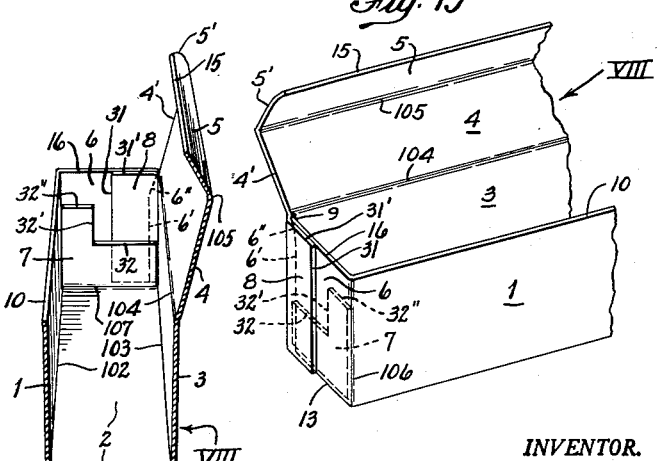
INVENTOR.
WILLIAM A. RINGLER
ATTORNEY.

Oct. 10, 1961  W. A. RINGLER  3,003,674
HINGED COVER BLANKS AND CARTONS
Filed March 8, 1954  10 Sheets-Sheet 8

INVENTOR.
WILLIAM A. RINGLER
BY
ATTORNEY.

Oct. 10, 1961     W. A. RINGLER     3,003,674
HINGED COVER BLANKS AND CARTONS
Filed March 8, 1954     10 Sheets—Sheet 9

INVENTOR.
WILLIAM A. RINGLER
BY
ATTORNEY.

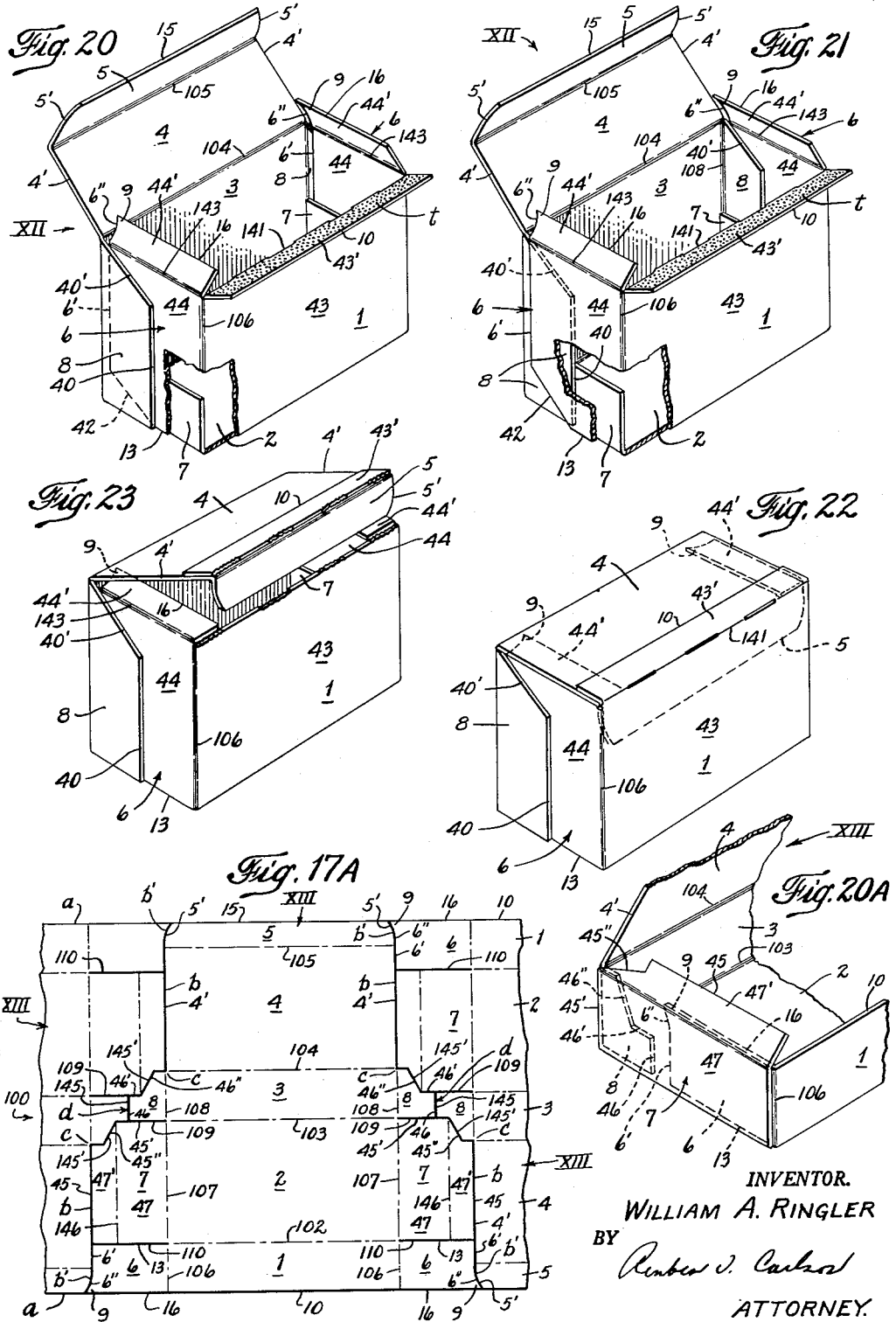

United States Patent Office 3,003,674
Patented Oct. 10, 1961

3,003,674
HINGED COVER BLANKS AND CARTONS
William A. Ringler, Wayne, Pa., assignor, by mesne assignments, to Diamond National Corporation, a corporation of Delaware
Filed Mar. 8, 1954, Ser. No. 414,569
21 Claims. (Cl. 229—33)

This invention relates to hinged cover blanks and cartons and more particularly to hinged cover cartons and carton forming blanks which are so formed that the marginal boundaries of adjacent blanks will snugly interfit with no resultant waste therebetween when cut from the stock sheet or stock roll.

Hinged cover cartons formed from paperboard, fiberboard and like sheet materials are extensively used for the packaging of numerous different types and kinds of merchandise. Hinged cover cartons are commonly made of one-piece blanks which present a front wall panel, a bottom wall panel, a rear wall panel, a cover or top wall panel and a tuck-in flap foldably connected by parallel extending scores to provide a carton body of rectangular cross-section of any desired length, width and height. The end walls are customarily formed by end wall forming flaps foldably connected to the ends of the bottom, front and rear wall panels and adhesively secured together in overlapped relationship.

Hinged cover cartons have heretofore been formed from blanks which are so shaped as to inevitably result in substantial waste of stock sheet material between adjacent boundaries of adjacent blanks as cut from the stock sheet. These stock sheet losses have resulted from inability to interfit the end wall forming flaps of adjacent blanks as cut from the stock sheet and from the necessity of providing the tuck-in flaps with rounded or tapered ends which do not interfit with any part of the adjacent blank. Also, the end wall forming flaps associated with the ends of the front, bottom and rear wall panels have been so shaped as to leave stock sheet waste therebetween. Nor has any way been found to shape the hinged cover carton forming blanks so that the side edges of the blanks can be placed in columnar alignment, without leaving an excessive amount of stock sheet waste along the sides of the stock sheet. As a result, stock sheet waste is not only produced between adjacent boundaries of adjacent blanks, but additional stock sheet waste is produced along the side edges of the stock sheet due to the fact that the blanks are not in columnar alignment.

The presence of waste segments or islands between the boundaries of adjacent blanks also creates serious waste stripping problems due to the difficulty of removing isolated segments or islands of waste material between the end wall forming flaps or between the adjacent boundaries of adjacent blanks. To facilitate the stripping operation, it has been customary to leave sufficient space between the boundaries of adjacent blanks so that the otherwise isolated islands or segments of waste material are interconnected by strip waste, but the stripping operation can thereby be facilitated only at the expense of producing additional stock sheet waste.

In accordance with this invention, hinged cover carton blanks, designed to provide sturdy and attractive hinged cover cartons, may be formed with no resultant waste of stock sheet material between the boundaries of adjacent blanks, and no waste stripping operation is required. These carton blanks are so patterned that the blanks may be cut from stock sheets in columnar rows by longitudinally extending parallel cuts which define both side margins of a column of aligned blanks. The distance between the longitudinally extended cuts is equal to the overall width of a single blank as defined by the combined width of the front panel, bottom panel, rear panel, top panel and tuck flap as foldably connected by longitudinally extending parallel scores. As thus patterned, the side edge of a front panel and the side edges of associated front end flaps are in alignment with each other and in alignment with the side edge of the tuck flap of the adjacent reversely arranged blank.

The front end flaps, the bottom end flaps and the rear end flaps which extend from both ends of the front, bottom and rear panels, are so shaped and contoured that the end margins of one blank will snugly interfit with the end margins of an adjacent reversely arranged blank when the side margins of the blanks are in true alignment. As a result, there is no stock sheet waste between the end margins of adjacent blanks, and no stock sheet waste between the longitudinal side edges of the blanks in the adjacent columnar strips.

The interfitting end margins of adjacent blanks in the columnar strips are produced by interconnected single line cuts which extend transversely of the columnar strip. These interconnected single line cuts comprise a pair of longitudinally spaced slit cuts extending transversely of the columnar strip and substantially parallel to each other. The length of each transverse cut is equal to the combined width of the tuck flap and top panel of the blank and thus defines the adjacent end margins of the tuck flap and top panel. The inner terminal ends of each pair of longitudinally spaced transverse cuts are joined by an intermediate cut which may be variously shaped to define rear end flaps and bottom end flaps with variably shaped end margins, and in certain blank forms an end section of the intermediate cut is employed to define a part of the marginal end of the front end flap and the adjacent rear end flap.

The outer end portions of the pair of transverse cuts which define the end edges of the tuck flaps of adjacent blanks, are flared so as to provide tuck flaps with tapered end edges which facilitate insertion thereof into the erected cartons. The tapered ends of the transverse cuts also define correspondingly shaped ear portions which project from the end edges of the front end flaps of adjacent blanks, so that the free edge contour of each ear portion is in reverse conformity to the tapered end edge of the adjacent tuck flap. As thus cut, the end margins of the tuck flap and top panel of one blank will interfit with the end margin of the adjacent front end flaps of the adjacent reversely arranged blanks. The intermediate cut which joins the inner ends of the paired and longitudinally spaced transverse cuts, and thus completes the separation of adjacent blanks, will define the end margins of the adjacent rear end flaps, will define all or at least a part of the end margins of the adjacent bottom end flaps, and in certain blank forms will define part of the end margins of the adjacent front end flaps.

In all blank forms, the bottom end flap will be separated from the adjacent rear end flap by a segmental slit cut which preferably extends in longitudinal alignment with the longitudinal score which foldably joins the bottom panel to the rear panel. In most blank forms, the front end flap is also separated from the adjacent bottom end flap by a slit cut which preferably extends substantially in alignment with the longitudinal score which joins the front panel to the bottom panel. However, in certain blank forms the front end flap may be separated from adjacent bottom end flap by a portion or segment of the intermediate cut which joins the inner terminal ends of the paired and longitudinally spaced transverse cuts.

The front end flaps are foldably joined to the ends of the front panel by a pair of substantially parallel transverse scores, the bottom end flaps are foldably joined to the ends of the bottom panel by a pair of substantially parallel transverse scores, and the rear end flaps are foldably joined to the ends of the rear panel by a pair of substantially parallel transverse scores. The transverse scores which define the ends of the front, bottom and rear panels are preferably substantially in alignment with each other so that the front, bottom and rear panels are substantially equal in length. The transverse scores are also substantially in alignment with the transverse cuts which define the end margins of the top panel. The space between the paired transverse cuts and the adjacent transverse scores in substantial alignment therewith, provides the material from which the front, bottom and rear end flaps of adjacent reversely arranged blanks are formed.

The end flaps may possess a wide range of shapes depending upon the longitudinal spacing of the paired transverse cuts, and the length and configuration of the intermediate cut which joins the inner terminal ends of the paired transverse cuts. Only the paired transverse cuts in the blank series are of substantially fixed length and configuration since they define the substantially parallel end margins of the top panels and the tapered marginal ends of the tuck flaps. In all blank forms, the inner ends of the paired transverse cuts terminate adjacent the terminal end of the longitudinal score which foldably joins the rear panel to the top panel.

Hinged cover tuck-flap cartons having any desired length, width and height, and whose end walls are variously formed by end flaps extended from the ends of the front, bottom and rear panels, may be made in accordance with this invention from innerfitted blanks which may be scored and cut from a stock sheet or a stock roll with no resulting waste of stock sheet material between adjacent marginal edges of the blanks. The ear portions projecting from the marginal ends of the front end flaps are wholly unobjectionable since they are overlapped by other parts of the assembled carton and do not project from or otherwise deface the rectangular contours of the assembled carton. The innerfitted blanks may be proportioned to provide dust flaps in association with certain of the end wall forming flaps thereof, and if desired, may be proportioned to provide a sealing flap section in association with the front panel which may be adhesively secured to the top panel of the assembled carton to further protect the merchandise content until opened by the consumer. Hinged cover tuck-flap cartons, made from interfitted blanks in accordance with this invention, are sturdy and strong in construction, pleasing in appearance, may be made in any desired length, width or height to receive and accommodate many different types and kinds of merchandise.

An object of this invention is to provide hinged cover carton forming blanks which are so shaped and formed as to permit high speed scoring and cutting thereof from stock sheets or stock rolls with no resultant waste of stock sheet material between blank boundaries.

Another object of this invention is to provide a series of similar interfitting hinged cover carton forming blanks which can be recovered from a stock sheet or stock roll in aligned columnar rows or strips whose width is equal to the width of a single blank, with the end margins of successive blanks in each columnar strip being separated by single line transversely extending slit cuts only, with the side margins of the blanks which compose the columnar strip in longitudinal alignment so that the columnar strips are separated by single line cuts only, and with no intervening stock sheet waste between adjacent marginal boundaries of the blanks.

Another object of this invention is to provide improved hinged cover tuck-flap cartons having any desired length, width or height which are sturdy and strong in construction, attractive in appearance, and which are assembled from one-piece blanks shaped to permit formation thereof with no resultant stock sheet waste.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which FIG. 1 illustrates a series of carton forming blanks made in accordance with this invention whose front panel and front end flaps have a width substantially equal to the combined width of the tuck-flap and top panel thereof, this view showing the manner in which such blanks may be scored and cut from a stock sheet or stock roll on a cutting and scoring machine with no resulting waste of stock sheet material between the marginal boundaries of adjacent blanks.

FIGS. 1A, 1B and 1C show a series of carton forming blanks whose front panels and front end flaps have a width substantially equal to the combined width of the tuck-flap and top panel thereof, to further illustrate the various ways in which the stock sheet or stock roll may be transversely cut to produce such blanks in columnar alignment with snugly interfitting end margins and no resultant waste between the margin boundaries of adjacent blanks.

FIG. 2 is a plan view of the carton blank cut and scored as shown in FIG. 1 having glue patches applied to the inside face of the rear end flaps thereof prior to its assembly and erection into a carton.

FIG. 3 is a plan view of the carton blank scored and cut as shown in FIG. 1 having the glue patches alternatively applied to the inside face of the front end flaps of the blank prior to its assembly into an erected carton.

FIG. 4 is a fragmentary perspective view of the carton as assembled from the glued blank shown in FIG. 2.

FIG. 5 is a fragmentary perspective view of the carton as assembled from the glued blank shown in FIG. 3.

FIGS. 5A, 5B and 5C are fragmentary perspective views illustrating the manner in which cartons may be assembled from the blanks shown in FIGS. 1A, 1B and 1C.

FIG. 6 is a perspective view of the carton shown in FIG. 4 as it would appear when the cover top panel has been swung into close position and the associated top flap inserted into the merchandise filled carton body.

FIGS. 7A and 7B show a series of carton forming blanks whose front panels have a width greater than the combined width of the tuck-flap and top panel thereof, these views further illustrating alternative ways in which the stock sheet or stock roll may be scored and cut to produce a series of such blanks in columar alignment with snugly interfitting end margins, and with no stock sheet waste between the marginal boundaries of adjacent blanks.

Figure 7:
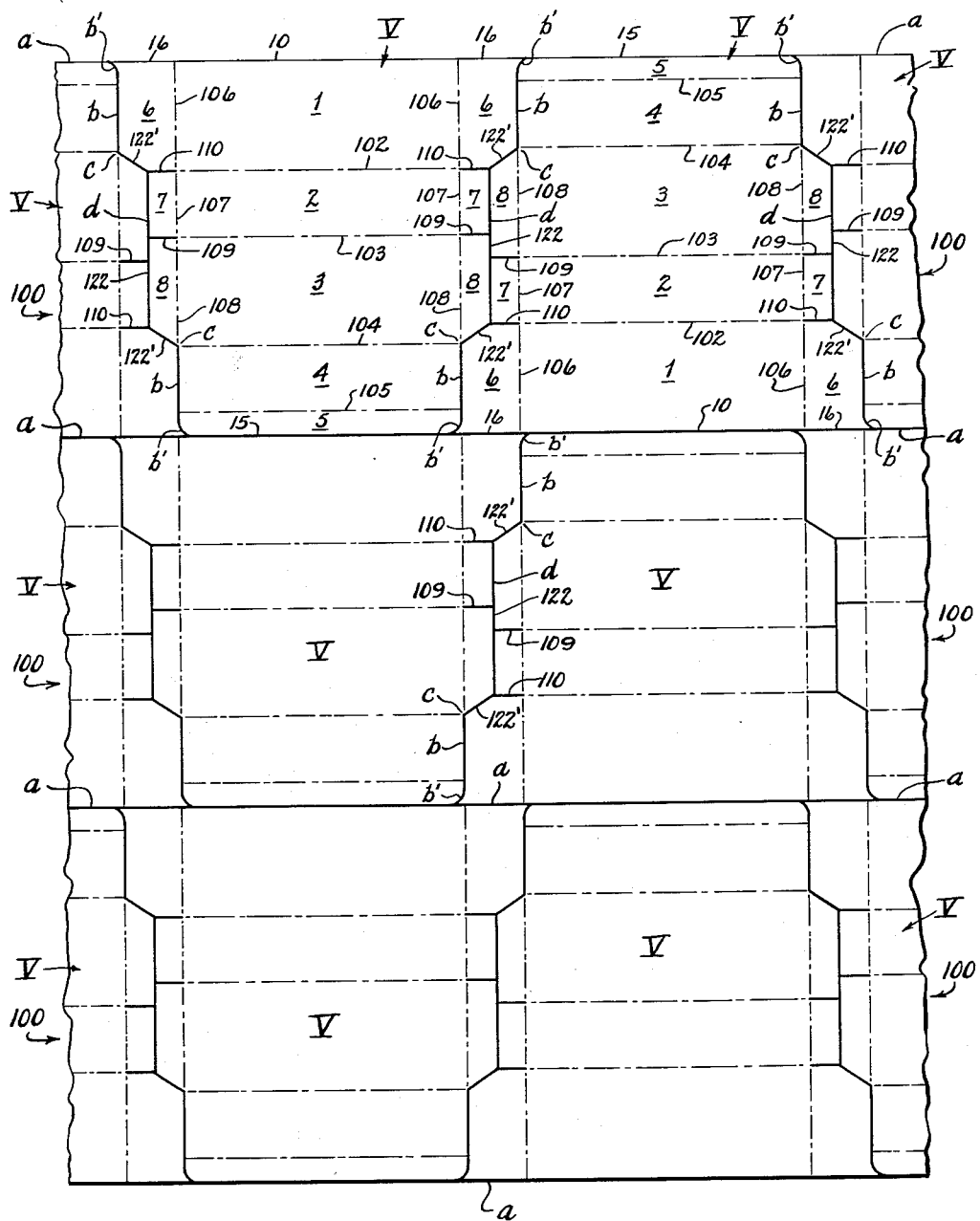
FIG. 7 illustrates the manner in which a series of carton forming blanks, whose front panels are wider than the combined width of the top panel and tuck-flap thereof, may be scored and cut from a stock sheet or stock roll in accordance with this invention with no resulting waste of stock sheet material between marginal boundaries of adjacent blanks.

FIG. 8 is a plan view of the carton blank cut and scored as shown in FIG. 7 having glue patches applied to the inside face of the rear end flaps thereof prior to its assembly into carton form.

FIG. 9 is a plan view of the carton blank scored and cut as in FIG. 7 and showing the glue patches alternately applied to the inside face of the front end flaps of the blank prior to its assembly into an erected carton.

FIG. 10 is a fragmentary perspective view of the carton as assembled from the glued blank shown in FIG. 8.

FIG. 11 is a fragmentary perspective view of the carton as assembled from the glued blank shown in FIG. 9.

FIGS. 11A and 11B are fragmentary perspective views showing the manner in which cartons may be assembled from blanks when cut and scored as shown in FIGS. 7A and 7B.

FIG. 12 illustrates the manner in which a series of carton forming blanks, whose front panel and front end flaps have a width less than the combined width of the tuck-flap and top panel thereof, may be scored and cut from a stock sheet or stock roll in accordance with this invention with no resulting waste between marginal boundaries of adjacent blanks.

Figure 12A:
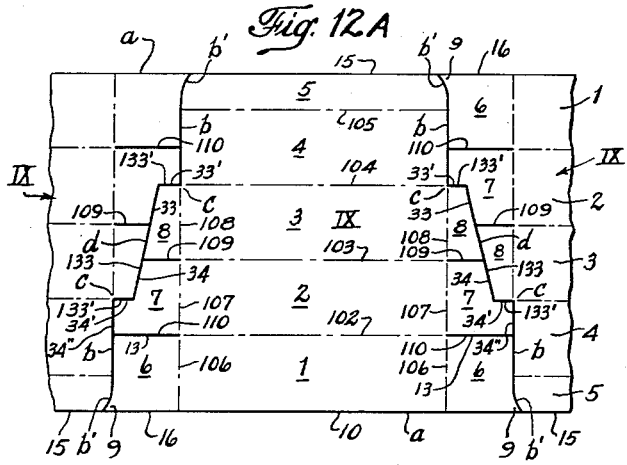
Figure 12B:
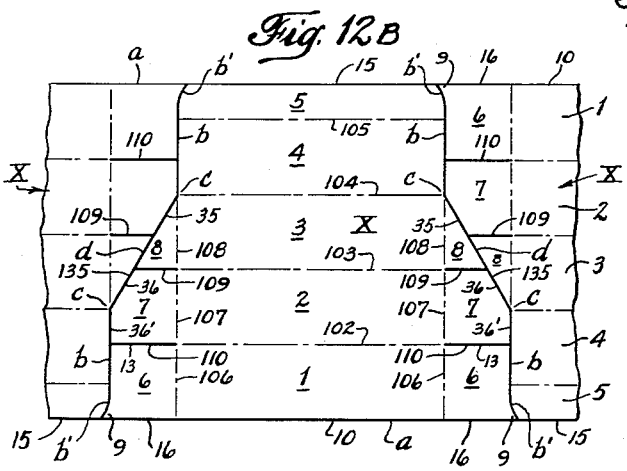
Figure 12C:
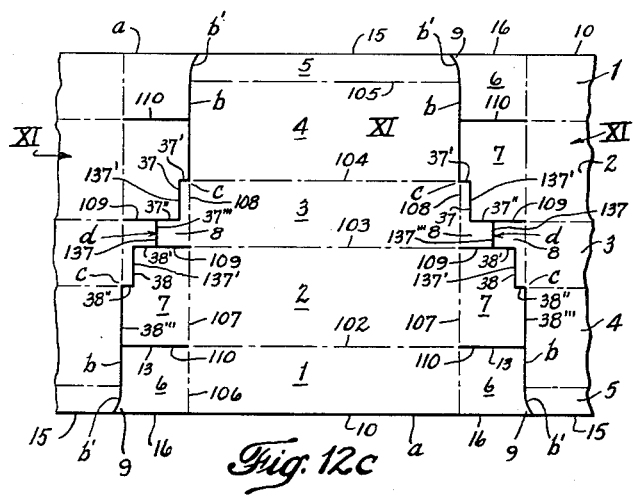

FIGS. 12A, 12B and 12C show a series of carton forming blanks whose front panel and front end flaps have a width less than the combined width of the tuck-flap and top panel thereof, these views further illustrating some of the alternative ways in which the stock sheet or stock roll may be transversely cut to produce such blanks in columnar alignment with snugly interfitting end margins and with no stock sheet waste being thereby produced between the marginal boundaries of adjacent blanks.

FIG. 13 is a fragmentary plan view showing the manner in which glue patches may be applied to the inside face of the front and rear end flaps of the blank when scored and cut as shown in FIG. 12.

FIG. 14 is a fragmentary plan view of a carton blank scored and cut as shown in FIG. 12 with the glue patches alternatively applied to the front end flaps only in preparation for its assembly into carton form.

FIG. 15 is a fragmentary perspective view of the carton assembled from the glued blank shown in FIG. 13.

FIG. 16 is a fragmentary perspective view of a carton assembled from the glued blank shown in FIG. 14.

Figure 16A:
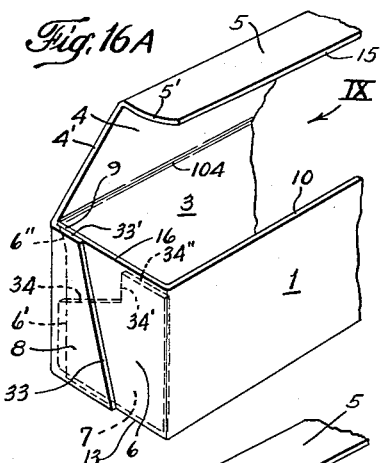
Figure 16B:
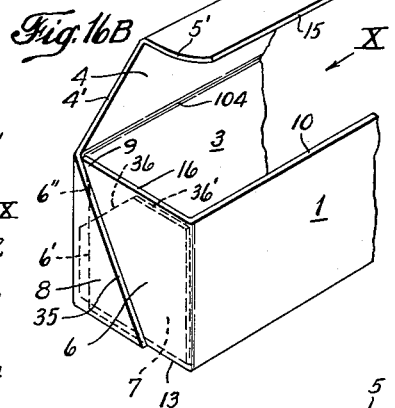
Figure 16C:
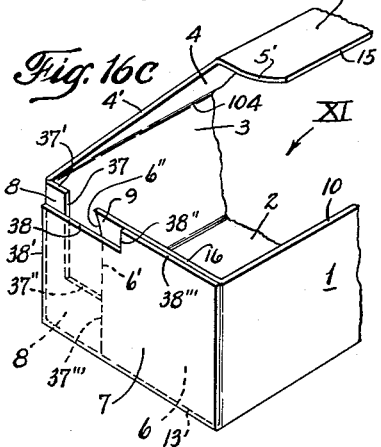

FIGS. 16A, 16B and 16C are fragmentary perspective views showing the manner in which cartons may be assembled from blanks which have been cut and scored as shown in FIGS. 12A, 12B and 12C.

Figure 17:
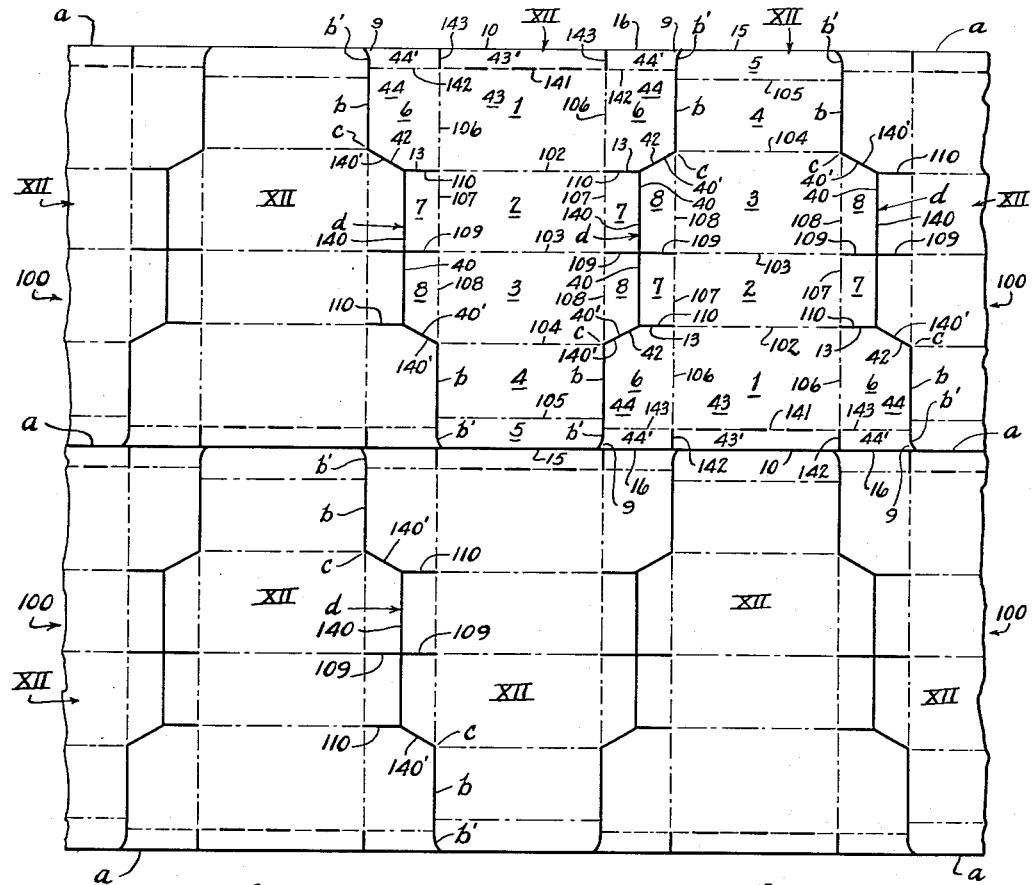

FIG. 17 illustrates the manner in which blanks may be cut and scored from a stock sheet or stock roll in accordance with this invention with no resulting waste between marginal boundaries of adjacent blanks to produce marginally interfitted and columnarily aligned blanks whose front end flaps are equipped with dust flaps and whose front panel is equipped with a sealing flap.

FIG. 17A shows a series of carton forming blanks whose front panel is of less width than the bottom panel and whose bottom end flaps provide end wall panels and dust flaps for the carton, this view illustrating the manner in which the stock sheet or stock roll may be transversely cut to effect snug interfitting of the end margins of adjacent blanks and with the blanks in columnar alignment so that no stock sheet waste results.

Figure 18:
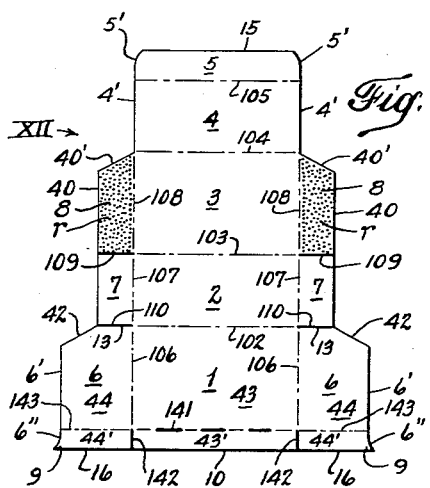

FIG. 18 is a plan view of a carton blank cut and scored as shown in FIG. 17 having glue patches applied to the rear end flaps thereof prior to its assembly into carton form.

Figure 19:
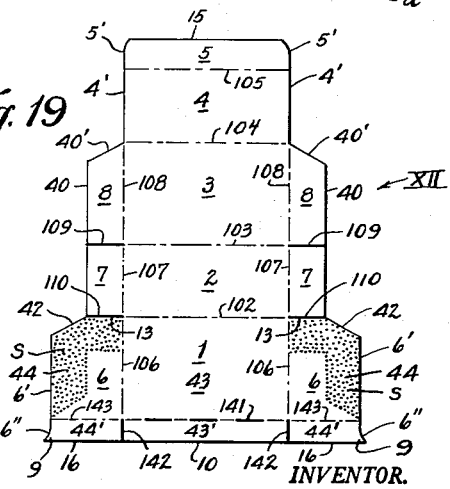

FIG. 19 is plan view of a carton blank scored and cut as shown in FIG. 17 with the glue patches alternatively applied to the inside face of the front end flaps thereof in preparation for its assembly into carton form.

FIG. 20 is a perspective view of the carton as assembled from the glued blank shown in FIG. 19.

FIG. 20A is a fragmentary perspective view of the carton assembled from the blank illustrated in FIG. 17A.

FIG. 21 is a perspective view of the carton as assembled from the glued blank shown in FIG. 18.

FIG. 22 is a perspective view of the carton illustrated in FIG. 20 as it would appear when the cover top panel has been fully closed and the front panel sealing flap bonded to the closed top panel; and FIG. 23 is a perspective view of the carton illustrated in FIG. 22 as it would appear when the sealing flap has been broken and the cover top panel is in process of being swung into open position to provide access to the contents.

Similar reference characters refer to similar parts throughout the several views of the drawings and specification.

Hinged covertuck-flap carton forming blanks made in accordance with this invention, and illustrated in accompanying drawings, are characterized by a front panel 1, a bottom panel 2, a rear panel 3, a cover top panel 4, and a tuck-flap 5, foldably joined in series arrangement by substantially parallel and longitudinally extending scores 102, 103, 104 and 105. A pair of end wall forming flaps 6 are foldably joined to the ends of the front panel 1 by a pair of substantially parallel and transversely extending scores 106, a pair of bottom end flaps 7 are foldably joined to the ends of the bottom panel 2 by a pair of substantially parallel and transversely extending scores 107, and a pair of rear end flaps 8 are foldably joined to the ends of the rear panel 3 by a pair of substantially parallel and longitudinally extending scores 108. As a further characteristic of the blanks made in accordance with this invention, each bottom end flap 7 is separated from the adjacent rear end flap 8 by a segmental slit 109 which extends from the adjacent terminal end of the bottom panel and rear panel connecting score 103, and is preferably substantially in alignment therewith. Each front end flap 6 may also be separated from the adjacent bottom end flap 7 by a slit cut 110 which extends from the adjacent terminal end of the front panel and bottom panel connecting score 102 and is preferably in alignment therewith.

Hinged cover tuck-flap cartons are normally substantially rectangular in form, with the front, bottom, rear and top panels thereof of substantially equal length, and with the tuck flap of substantially the same length as the top panel to which it is foldably joined, except that the end edges of the tuck flap are variously rounded or tapered to facilitate insertion of the tuck flap into the assembled carton. The hinged cover tuck-flap carton-forming blanks made in accordance with this invention, also present front, bottom, rear and top wall panels of substantially equal length. Therefore, the parallel extending transverse scores 106, 107 and 108 which define the ends of the front panel 1, bottom panel 2 and rear panel 3 respectively, are substantially in alignment with each other and are also substantially in alignment with the parallel extending end margins 4' of the top panel 4, with the tuck flap 5 provided with substantially rounded or tapered end edges 5' which merge into the end margins 4' of the top panel 4.

The end edges 5' of the tuck flaps 5 associated with the various blanks made in accordance with this invention will hereafter be referred to as having tapered end edges, but it will be understood that this terminology is intended to include various end edge forms which may be straight tapered, biased tapered, partly or wholly arcuate or curvilinear in form, or otherwise shaped to facilitate insertion of the tuck flap into the carton and yet provide a certain degree of end edge friction between the inserted tuck flap and the end walls of the carton so that the tuck flap will be frictionally retained in its inserted position.

Blanks made in accordance with this invention are so shaped and formed that the adjacent boundaries of the adjacent blanks are separate by slit cuts only, so that no stock sheet waste is produced between adjacent boundaries of adjacent blanks, which would otherwise have to be stripped and removed. To recover the blanks, the stock sheet or stock roll is slit cut by one or more parallel cuts $a$ which extends longitudinally thereof, thereby defining two or more columnar strips 100, each having a width equal to the overall width of the flattened carton forming blank. The longitudinal extending cuts $a$ accordingly define the side edges of a single row of aligned blanks as cut from the columnar strip. For example, each longitudinal cut $a$ defines the side edge 10 of the front panel 1 and the side edges 16 of the associated front end flaps 6 of each blank, and in addition, defines the side edge 15 of the tuck-flap 5 of the adjacent reversely arranged blank as cut from the stock sheet. As thus cut, the side edge 10 of the front panel 1 and the side edges 16 of the associated front end flaps of one blank are in alignment with each other, are also in alignment with the side edge 15 of the tuck flap 5 of the adjacent reversely arranged blank and, in addition, are substantially parallel to the side edge 15 of its associated tuck flap 5. The longitudinally extending cuts $a$ which define the side edges of the reversely arranged blank in each columnar strip 100 therefore produces no stock sheet waste between the marginal side boundaries of the blanks in adjacent columnar strips.

The marginal ends of the blanks made in accordance with this invention are so shaped and formed as to snugly interfit when the side edges of adjacent reversely arranged blanks are in true alignment. Accordingly, the end margins of the blanks in each columnar strip are separated from each other by single line slit cuts which extend across the width of the columnar strip and are shaped to define the end margins of the tuck flap, top panel, rear end flap, bottom end flap and front end flap of one blank as snugly interfitted with the end margins of the front end flap, bottom end flap, rear end flap, top panel and tuck flap of the adjacent reversely arranged blank.

The end margins of adjacent reversely arranged blanks are defined by a pair of longitudinally spaced and transversely extending slit cuts $b$ having reversely flared ends $b'$ which define the adjacent tapered end edge 5' of the adjacent tuck flap 5. The paired transverse cuts $b$ and associated flared end portions $b'$ extend inwardly from the longitudinally extending cuts $a$, and are substantially of equal length, so that their inner ends $c$ terminate at the terminal end of the adjacent rear panel and top panel connecting score 104. Each transverse cut $b$ and its flared end portion $b'$ thus defines the adjacent marginal edge 5' of the tuck flap 5 and the adjacent marginal edge 4' of the top panel 4 and, in addition, defines either all of the marginal edge, or at least part of the marginal edge, of the front end flap 6 of the adjacent reversely arranged blank and, in some cases, defines a substantial part of the end margin of the bottom end flap of the adjacent reversely arranged blank.

Each of the paired transverse cuts $b$ are substantially in alignment with the adjacent transverse scores 108, 107 and 106 which define the adjacent ends of the rear panel 3, bottom panel 2 and front panel 1. Thus the stock sheet material defined between each pair of transverse cuts $b$ and associated flared ends $b'$ and the transverse scores 108, 107 and 106 in alignment therewith, provides the material from which is formed the front end flaps, bottom end flaps and rear end flaps at the adjacent ends of two reversely arranged blanks. The inner terminal ends $c$ of the paired transverse cuts $b$ are joined by an intermediate slit cut $d$ which completes the end formation of the end flaps associated with the adjacent ends of two reversely arranged blanks. The intermediate cut $d$ which joins the terminal ends $c$ of each pair of transverse cuts $b$ may be variously shaped in accordance with the height and width of the cartons to be formed, and may be further variably shaped to additionally provide dust flaps associated with the end walls of the carton. The various shapes and configurations which may be given to the intermediate cuts $d$ to produce the various blank forms of this invention will be explained in further detail hereafter. In all cases, however, the paired transverse cuts $b$ and associated end portons $b'$ as joined by the intermediate cut $d$ are shaped and formed to provide complete slit cut severance of the interfitted end margins of adjacent blanks in the columnar strip so that no stock sheet waste is produced between the end margins of adjacent blanks.

As a further characteristic of the blanks made in accordance with this invention, each transverse cut $b$ and its flared end $b'$ define a substantially straight end margin 6' and a flared marginal extension 6" of the adjacent front end flap 6 of the adjacent blank, each flared marginal extension 6" being shaped in reverse conformity to the tapered end edge 5' of adjacent tuck flap 5 of the adjacent reversely arranged blank. The flared edge 6" of the front end flap 6 thus defines an ear portion 9 projecting from the end edge 6' of the front end flap 6 adjacent the longitudinal side edge 16 thereof. However, the blanks are in all cases so shaped and formed that the ear portions 9 do not project beyond the normally rectangular contours of the cartons assembled therefrom, are substantially unnoticeable, and do not impair the attractive appearance of the formed cartons.

In all of the stock sheet scoring and cutting patterns of this invention, the adjacent blanks in each columnar strip are alternately reversed in position so that the adjacent end margins of adjacent blanks are separated only by the paired and similar transverse cuts $b$ and their reversely similar flared continuations $b'$, and by the intermediate connecting cut $d$ which may be of varying configuration. No strips or islands of stock sheet material remain between the end margins of adjacent blanks in the columnar strip of sheet material. The blanks as cut from adjacent columnar strips 100 are separated by the longitudinally extending single line cuts $a$ only, so that there are no islands or strips of stock sheet material between the blanks as recovered from adjacent columnar stock sheet strips.

The number of blank containing columnar strips which can be cut from the stock sheet or stock roll depends upon the overall width of the stock sheet or roll, as well as the width of the columnar strips as determined by the overall width of the columnar arranged blanks to be cut therefrom. It will therefore be appreciated that the stock sheets or rolls are preferably made in such widths as to permit the cutting of a convenient number of columnar strips of the required blank forming width, with a minimum amount of side trimming of the stock sheet. Since the outer side edges of the outermost columnar strips are straight and extend longitudinally of the stock sheet or roll, the waste side edge strips will be substantially uniform in width, and by making the stock sheets or rolls in appropriate widths, side trimming may be strictly limited to that required to remove damaged side edges of the stock sheet which would be unsuitable for incorporation into carton blanks. As a result, the very maximum number of hinged cover carton forming blanks may be cut from stock sheets and stock rolls of selected widths, with side stripping strictly limited to the removal of damaged stock sheet edges only, and with no resultant stock sheet waste being produced between adjacent boundaries of adjacent blanks which require removal.

In addition to the savings in stock sheet material and the elimination of the costly stripping operation which can be effected by the practice of this invention, the cutting and scoring operation may also be effected at substantially higher production speeds since there are no loose waste strips or islands which often clog the cutting and scoring mechanism, and which required running of the cutting and scoring machine at substantially below its capable speed of operation, and during passage of the stock sheet or stock roll through the cutting and scoring machine, all necessary scores and cuts are applied to the blank patterns to complete the formation of the carton blanks. As a further advantage, the columnar strips can be completely separated from each other by the longitudinal cuts $a$, and the adjacent blanks can also be fully separated from each other by the paired transverse cuts $b$ and $b'$ and the intermediate connecting cut $d$, so that all the blanks produced are fully separated as they leave the cutting and scoring machine, and are all in usable form, so that the blank losses which have heretofore resulted from careless stripping of waste stock material is also saved.

The accompanying drawings are intended to illustrate the numerous and varied scoring and cutting patterns which may be employed to produce carton forming blanks of various shapes and forms and from which numerous types of hinged cover tuck-flap cartons may be assembled of varying width and height as well as length, including hinged cover tuck-flap cartons having dust flaps associated with the end walls thereof, as well as sealing flaps associated with the front panels thereof.

For example, the stock sheet scoring and cutting patterns illustrated in FIGS. 1, 1A, 1B and 1C produce interfitting hinged cover tuck-flap carton forming blanks without waste of stock sheet material, whose front panels 1 and associated front end flaps 6 have a width substantially equal to the combined width of the cover top panel 4 and associated tuck-flap 5, with the front and rear panels 1 and 3 of substantially equal width, and with the bottom and top panels 2 and 4 of substantially equal width. As thus formed, the length of the end margins 4'—5' of the top panel and associated tuck flap as defined by the transverse cuts b—b' are substantially equal in length to the end margins 6'—6'' of the adjacent front end flaps 6. The paired transverse cuts b—b' are also longitudinally spaced so that the length of the side margin 16 of each front end flap 6 is not more than the width of the bottom panel 2. As thus formed, the paired transverse cuts b—b' define the entire end edge margin 6'—6'' of each front end flap 6. The intermediate cut d, which joins the terminal ends c of the paired transverse cuts b, defines the end margins of the bottom and rear end flaps 7 and 8 at the adjacent ends of the reversely arranged adjacent blanks. The intermediate cuts d may have various shapes and configurations dependent upon the shape and form of the bottom and rear end flaps desired.

Figure 1:
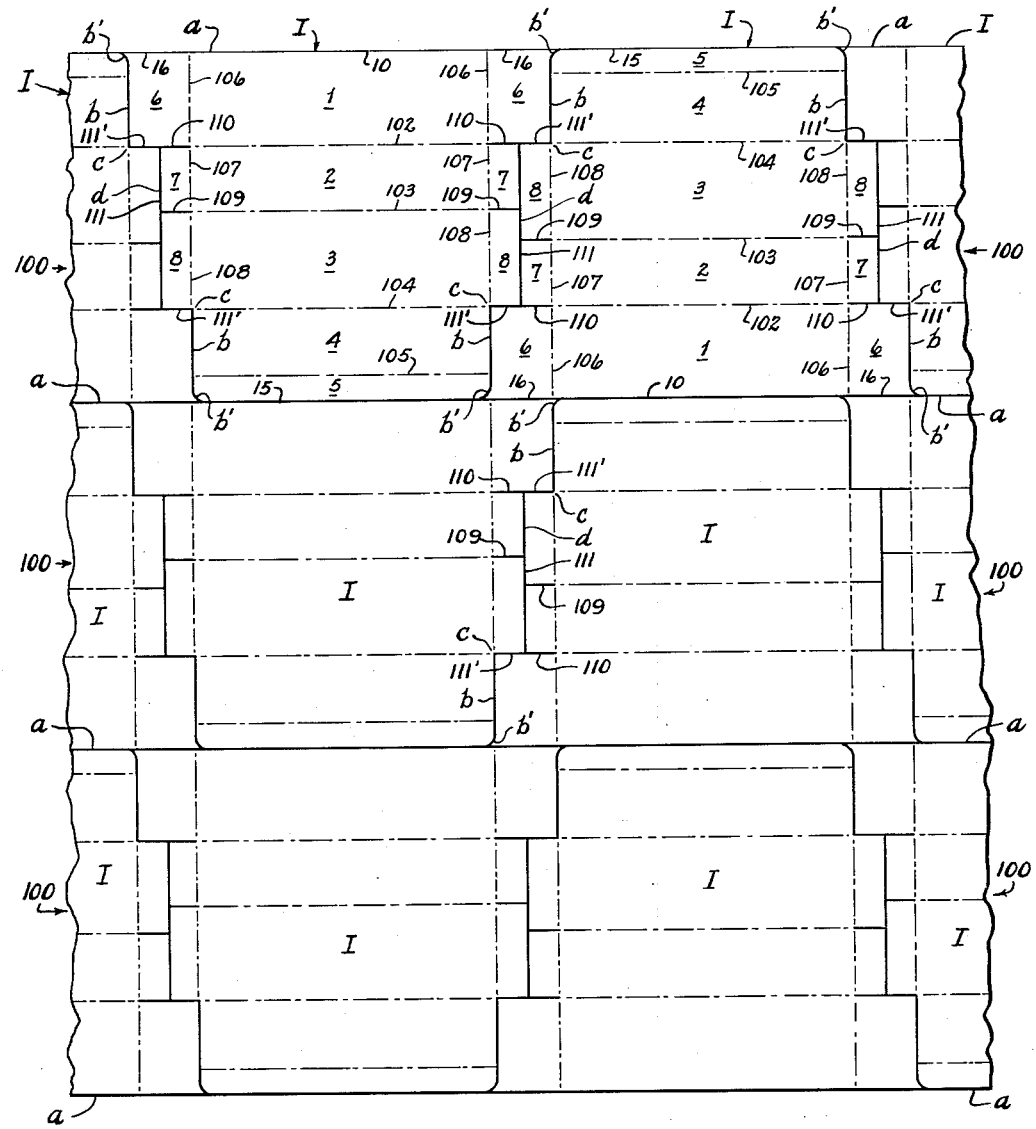

In the blank pattern illustrated in FIG. 1, each intermediate cut d comprises a main cut section 111 extending substantially at right angles to the longitudinal scores 102, 103 and 104 and is substantially equidistantly spaced between the adjacent transverse scores 107 and 108 of adjacent blanks I so that the adjacent bottom and rear end flaps 7 and 8 of adjacent blanks have substantially the same length, and with the end margins 11 of the rear end flaps 8 and the end margins 12 of the adjacent bottom end flaps 7 of each blank substantially in alignment. The transverse cut segment 111 of the blank pattern shown in FIG. 1 is joined to the terminal ends c of the paired transverse cuts b by substantially parallel connecting cuts 111' which are substantially in alignment with the adjacent slit cuts 110 which separates the front end flap 6 from the adjacent bottom end flap 7. The connecting cuts 111' also define the top edge margin 11' for the adjacent rear end flap 8 which is substantially in alignment with the rear panel and top panel connecting score 104. The segmental cut 110, and the connecting cut 111' substantially in alignment therewith, together define a bottom edge 13 for the adjacent front end flap 6 which is substantially in alignment with the front panel and bottom panel connecting score 102. When the stock sheet has been cut and scored in accordance with the cutting and scoring pattern illustrated in FIG. 1, the blanks I removed therefrom will be shaped and formed as shown in FIGS. 2 and 3.

In the blank pattern illustrated in FIG. 1A, each intermediate cut d comprises a single line intermediate cut 114 which extends diagonally of the longitudinal scores 102, 103 and 104 and joins the terminal ends c of the paired transverse cuts b as a substantially straight-line cut. The adjacent bottom and rear end flaps 7 and 8 of the adjacent blanks II therefore present inclined end margins 14 and 17 which are substantially in alignment and provide substantially triangular shaped rear end flaps 8 and semi-triangular bottom end flaps 7, with the bottom end flaps 7 of the blanks II being longer than the adjacent rear end flaps 8. The adjacent bottom and rear end flaps 7 and 8 are separated by the segmental cut 109 which preferably extends substantially in alignment with the bottom and rear panel connecting score 103. Each front end flap 6 is separated from the adjacent bottom end flap by the segmental cut 110 which preferably extends substantially in alignment with the front panel and bottom panel connecting score 102 and thus defines the entire bottom edge 13 of the front end flap 6.

In the blank pattern illustrated in FIG. 1B, each intermediate cut d comprises a main cut section 118 extending diagonally to the longitudinal scores 102, 103 and 104 but has a lesser inclination than the diagonal intermediate cuts 114 employed in the blank pattern of FIG. 1A. The main cut section 118 extends intermediately between the adjacent transverse scores 107 and 108 of adjacent blanks III with the adjacent bottom and rear end flaps 7 and 8 of adjacent blanks substantially similar in shape and form and with the end margins 18 of the rear end flaps 8 and the end margins 19 of the adjacent bottom end flaps 7 in tapering alignment. The transverse cut segment 118 of the blank pattern shown in FIG. 1B is joined to the terminal ends c of the paired transverse cuts b by substantially parallel connecting cuts 118' which are substantially in alignment with the adjacent slit cuts 110 which separate the front end flap 6 from the adjacent bottom end flap 7. The connecting cuts 118' define the top margins 18' for the adjacent rear end flaps 8 which are substantially in alignment with the rear panel and top panel connecting score 104, and the segmental cut 110 and the adjacent connecting cut 118' together define the bottom edge 13 for the adjacent front end flap 6 which is substantially in alignment with the front panel and bottom panel connecting score 102.

In the blank pattern illustrated in FIG. 1C, each intermediate cut d comprises a main cut section 120 extending diagonally between the adjacent terminal ends of the front and bottom panel connecting scores 102 of adjacent reversely arranged blanks IV. The ends of the diagonally extending cut section 120 are connected to the adjacent terminal ends c of the paired transverse cuts b by substantially parallel connecting cuts 120' which are substantially in alignment with the rear panel and front panel connecting scores 104 of the adjacent reversely arranged blanks. The intermediate cut d as thus defined by the diagonal cut 120 and the connecting segmental cuts 120' has a generally Z-shaped configuration which produces two triangular shaped bottom end flaps 7 and two semi-triangular shaped rear end flaps 8 associated with the adjacent ends of the adjacent reversely arranged blanks IV. Each bottom end flap 7 is separated from the adjacent rear end flap 8 by the segmental cut 109 which preferably extends substantially in alignment with the bottom panel and rear panel connecting score 103, and the tapered end margin 20 of each rear end flap 8 is substantially in alignment with the tapered end margin 21 of the adjacent bottom end flap 7. Each connecting cut 120' as thus formed defines the entire bottom edge 13 for the adjacent front end flap 6, and also defines the entire top edge 20' of the rear end flap 8 of the blank IV.

The blank patterns shown in FIGS. 1, 1A, 1B and 1C illustrate only some of the numerous configurations which the intermediate cut d may assume to provide bottom end flaps and rear end flaps of various shapes and contours. All of these blanks may be assembled into carton form on standard carton assembly equipment. In assembling blanks I patterned as shown in FIG. 1, a patch r out of adhesive may be applied to the inside face of the rear end flaps 8 only, as shown in FIG. 2. The front and rear end panels 1 and 3 of the glued blank shown in FIG. 2 may first be erected, followed by the erection of the bottom end flaps 7. The front end flaps 6 may then be inturned, followed by the inturning of the glued rear end flaps 8 so as to overlie and adhere to the outside face of the adjacent inturned front end flaps 6, thereby producing the erected carton as shown in FIG. 4. Alternatively, adhesive patches s may be applied to the inside face of the front end flaps 6 as shown in FIG. 3, the front and rear end panels 1 and 3 then erected, the bottom end flaps 7 thereof upturned, the rear end flaps 8 then inturned, and the glued front end flaps 6 finally inturned so as to overlie and adhere to the outside face of the inturned rear end flaps 8, thereby producing an erected carton as shown in FIG. 5.

By following the assembling procedures above described in connection with the blanks shown in FIGS. 2 and 3, the blanks II, III and IV as patterned in FIGS. 1A, 1B and 1C may be similarly assembled into carton form as illustrated in FIGS. 5A, 5B and 5C. In all cases, the bottom end flaps 7 preferably provide the inner ply for the erected end walls since the erected bottom end flaps 7 are of less height than the end wall. Due to the irregularity in shape of the rear end flaps 8 of the blanks II, III and IV, the front end flaps 6 preferably, but not necessarily, are assembled to overlie and are adhesively secured to the outside face of the rear end wall flaps 8 as shown in FIGS. 5A, 5B and 5C. As thus assembled, the front end flaps 6, supplemented by the rear end flaps 8 as adhesively secured thereto, provide full height and full width end walls for the carton. The longitudinal edges 16 of the front end flaps 6 have a length which may closely approximate the overall width of the erected carton, but in no case should the ear portions 9 associated therewith extend beyond the plane of the rear panel 3 of the carton, which can be assured by the appropriate longitudinal spacing of the paired transverse cuts b as patterned on the stock sheet.

Hinged cover tuck-flap carton forming blanks, whose front panels 1 are of greater width than the combined width of the top panel 4 and tuck-flap 5 of the associated blank, may be recovered from stock sheets without resultant waste of stock sheet material between the boundaries of adjacent blanks, by following the stock sheet scoring and cutting patterns as illustrated in FIGS. 7, 7A and 7B. In these blank forms, the front and rear panels 1 and 3 are of substantially equal width and the bottom and top panels 2 and 4 are of substantially equal width, with the front and rear panels 1 and 3 of greater width than the bottom panel 2 to thereby produce hinged cover tuck-flap cartons of greater height than width. As thus formed, the length of the end margins 4'—5' of the top panel 4 and associated tuck flap 5 as defined by the transverse cuts b—b' is less than the length of the transverse scores 106 which define the ends of the front panel, and consequently the end margins 6'—6" of the front end flaps 6 as defined by the adjacent transverse cuts b—b' are of less length than the transverse scores 106 but are nevertheless equal in length to the length of the end margins 4'—5' of the top panel 4 and tuck flap 5. The paired transverse cuts b—b' are so longitudinally spaced that the length of the side margin 16 of each front end flap 6 is not more than the width of the bottom panel 2.

As thus formed, the paired transverse cuts b—b' define the entire terminal edge 4'—5' of the top panel and associated tuck flap, but the end margin 6'—6" of the front end flaps as thereby defined constitutes only a part of the total end margin of the front flap. The intermediate cut d, which joins the terminal ends c of the paired cuts b in the blank patterns shown in FIGS. 7, 7A and 7B, define the end margins of the bottom and rear end flaps 7 and 8 of the adjacent reversely arranged blanks, and in addition, defines a part of the end margin of the adjacent front end flaps. The intermediate cuts d may have various shapes and contours, depending upon the shape and form of the bottom, rear end front end flaps which are desired.

In the blank pattern illustrated in FIG. 7, each intermediate cut d comprises a main cut section 122 extending substantially at right angles to the longitudinal scores 102, 103 and 104 and is substantially equidistantly spaced between the adjacent transverse scores 107 and 108 of adjacent blanks V so that the adjacent bottom and rear end flaps 7 and 8 of adjacent blanks have substantially the same length, with the end margin 22 of the rear end flap 8 and the end margin 23 of the adjacent bottom end flap 7 of each blank substantially in alignment. The main intermediate cut 122 of the blank pattern shown in FIG. 7 is joined to the terminal ends c of the paired transverse cuts b by substantially parallel and diagonally extending cuts 122' which define the tapered top edge 22' of the rear end flap 8 of one blank and a miter cut end edge portion 24 of the front end flap 6 of the adjacent reversely arranged blank. The adjacent bottom and rear end flaps 7 and 8 of each blank V are separated by segment cut 109 which preferably extends substantially in alignment with the bottom panel and rear panel connecting score 103, and the bottom end flap 7 is separated from the bottom edge 13 of the adjacent front end flap 6 by the segmental cut 110 which preferably extends substantially in alignment with the front panel and bottom panel connecting score 102. When the stock sheet has been cut and scored in accordance with the cutting and scoring pattern illustrated in FIG. 7, the blanks I removed therefrom will be shaped and formed as shown in FIGS. 8 and 9.

In the blank pattern illustrated in FIG. 7A, each intermediate cut d comprises a single line intermediate cut 125 which extends diagonally of the longitudinal scores 102, 103 and 104 and joins the terminal ends c of the paired transverse cuts b by a pair of connecting cuts 125' which are substantially parallel to each other and preferably substantially in alignment with the adjacent rear panel and top panel connecting score 104. The main intermediate cut 125 extends intermediately between the adjacent transverse scores 106, 107 and 108 of adjacent blanks VI, with the adjacent bottom and rear end flaps 7 and 8 of adjacent blanks substantially similar in form and with the end margins 25 of the rear end flaps 8 and the end margins 26 of the adjacent bottom end flaps 7 in tapering alignment. Each bottom end flap 7 is separated from the adjacent rear end flap 8 by the segmental cut 109 which is preferably substantially in alignment with the bottom panel and rear panel connecting score 103, and the bottom end flap 7 is separated from the adjacent bottom edge portion 13 of the adjacent front end flap 6 by the segmental cut 110 which is preferably substantially in alignment with the front panel and bottom panel connecting score 102. The connecting cuts 125' define the top margins 25' for the adjacent rear end flaps 8 which are substantially in alignment with the rear panel and top panel connecting score 104, and also defines the adjacent marginal edge portions 27 of the adjacent front end flap 6. The marginal edge portions 27 of the front end flaps 6 are subsequently covered by the rear end flaps 8 when the blank VI is assembled into carton form as shown in FIG. 11A.

In the blank pattern illustrated in FIG. 7B, each intermediate cut d comprises a main cut section 128 extending substantially at right angles to the longitudinal scores 102, 103 and 104 and is substantially equidistantly spaced between the adjacent transverse scores 107 and 108 of the adjacent blanks VII so that the bottom and rear end flaps 7 and 8 of adjacent blanks have substantially the same length, with the end margin 28 of the rear end flap 8 and the end margin 29 of the adjacent bottom end flap 7 substantially in alignment. The main intermediate cut 128 of the blank pattern shown in FIG. 7B is joined to the terminal ends c of the paired transverse cuts b by generally Z-shaped connecting cuts 128' which define top edges 28' for the rear end flaps 8 which are substantially in alignment with the adjacent rear panel and top panel connecting scores 104. Each Z-shaped connecting cut 128' also defines a marginal edge portion 30 for the adjacent front end flap 6 of the adjacent blank whose cut-out formation becomes covered by the rear end flap 8 when the blank VII is assembled into carton form as shown in FIG. 11B. The adjacent bottom and rear end flap 7 and 8 of each blank VII are separated by the segmental cut 109 which preferably extends substantially in alignment with the bottom panel and rear panel connecting score 103, and the bottom end flap 7 is separated from the bottom edge 13 of the adjacent front end flap 6 by the segmental cut 110 which preferably extends substantially in alignment with the front panel and bottom panel connecting score 102.

The blank patterns shown in FIGS. 7, 7A and 7B are intended to illustrate the numerous configurations which the intermediate cuts $d$ may assume to provide rear, bottom and front end flaps of various shapes and contours in accordance with this invention. All of these blanks may be assembled into carton form on standard carton assembly equipment. In assemblying the blanks V patterned as shown in FIG. 7, a patch of adhesive $r$ may be applied to the inside face of the rear end flaps 8 only as shown in FIG. 8. The front and rear end flaps 1 and 3 and the bottom end flaps 7 may then be erected, the front end flaps 6 inturned, and the glued rear end flaps 8 then inturned to overlie and adhere to the outside face of the adjacent front end flaps 6, thereby producing the erected carton as shown in FIG. 10. Alternatively, adhesive patches $s$ may be applied to the inside face of the front end flaps as shown in FIG. 9, the front and rear end flaps 1 and 3 and the bottom end flaps 7 then erected, the rear end flaps 8 inturned, and the glued front end flaps 6 then inturned so as to overlie and adhere to the outside face of the inturned rear end flaps 8, thereby producing an erected carton as shown in FIG. 11.

By following the assembly procedures above described, the blanks VI and VII patterned as shown in FIGS. 7A and 7B may be similarly assembled into the carton forms shown in FIGS. 11A and 11B. The upturned bottom end flaps 7 provide closure flaps for the bottom ends of the carton, and the overlapped and adhesively secured front end flaps 6 and rear end flaps 8 provide the end walls for the carton, with the longitudinal edges 16 of the front end flaps 6 forming the top edges of the carton end walls. The irregular corner portions at the lower ends of the front end flaps 6 of the assembled cartons as defined by the cut out marginal edge portions 27 and 30, are fully covered by the overlapping rear end flaps 8 which may be secured either to the outside face of the front end flaps as shown in FIG. 11A, or to the inside face of the front end flaps 6 as shown in FIG. 11B. The transverse cuts $b$—$b'$ of the blank patterns shown in FIGS. 7A and 7B are so spaced that the formed ear portions 9 associated with the erected front end flaps 6 as shown in FIGS. 11A and 11B overlie the inturned rear end flaps 8 and do not project beyond the rear panel 3 of the cartons. The top edges 25' and 28' of the rear end flaps 8 as shown in FIGS. 11A and 11B also lie substantially in the plane of the cover hinging score 104. Strong and sturdy hinged cover tuck-flap cartons, which are attractive in appearance, and have a greater height than width, can thus be produced without resulting waste of stock sheet material.

Hinged cover tuck-flap carton forming blanks, whose front panels 1 are of less width than the combined width of the top panel 4 and tuck flap 5, may be recovered from stock sheets without resulting waste of stock sheet material, by following the scoring and cutting pattern as illustrated in FIGS. 12, 12A, 12B and 12C. In these blank forms, the front and rear panels 1 and 3 are of substantial equal width, with the front and rear panels 1 and 3 of either greater or less width than the bottom panel 2, to thereby produce hinged cover tuck flap carton whose height is greater than, substantially equal to, or less than the width of the bottom panel. As thus formed, the length of the end margins 4'—5' of the top panel 4 of associated tuck flap 5 as defined by the transverse cuts $b$—$b'$ is greater than the width of the front panel 1 and the associated front end flaps 6. Thus each transverse cut $b$—$b'$ defines the entire end margin 6'—6" of the adjacent front end flap 6 of one blank as well as a marginal end portion of the adjacent bottom end flap.

The paired transverse cuts $b$—$b'$ are so spaced that the longitudinal side edges 16 of the front end flaps 6 have a length which is not greater than, and in some cases may be less than, the width of the bottom panel 2. Each front end flap 6 is separated from the adjacent bottom end flap 7 by the segmental cut 110 which preferably extends substantially in alignment with the front panel and bottom panel connecting score 102, and each bottom end flap 7 is separated from the adjacent rear end flap 8 by the segmental cut 109 which is preferably substantially in alignment with the bottom panel and rear panel connecting score 103. As a characteristic feature of the blanks VIII, IX, X and XI patterned as shown in FIGS. 12, 12A, 12B and 12C, the inner terminal ends $c$ of the paired transverse cuts $b$ are joined by the intermediate cut $d$ which defines the end margins of the rear and bottom end flaps 8 and 7 only, but may have various shapes and contours depending upon the shape and form of the bottom and rear end flaps which are desired.

In the blank pattern illustrated in FIG. 12, each intermediate cut $d$ comprises a main intermediate cut 131 extending substantially at right angles to the longitudinal scores 102, 103 and 104 and is substantially equidistantly spaced between the adjacent transverse scores 107 and 108 of the adjacent blanks VIII. The main intermediate cut 131 is joined to the terminal ends $c$ of the paired transverse cuts $b$ by substantially parallel and longitudinally extending cuts 131' which extend from the terminal ends of the adjacent rear panel and top panel hinging score 104 and are substantially in alignment therewith and define the top margin 31' of the adjacent rear end flap. The end margins 31 of the rear end flaps 8 are substantially parallel to the transverse scores 108 and are substantially in alignment with an edge portion 32 of the marginal edge of the adjacent bottom end flap 7. However, each connecting cut 131 defines a vertical edge margin 32' of the bottom end flap 7 and the adjacent transverse cut $b$ defines the remaining marginal edge portion 32" of the bottom end flap 7 so that a part of each bottom end flap 7 is substantially equal in length to the length of the adjacent front end flap 6. The bottom edge 13 of each front end flap 6 is wholly defined by the segmental cut 110. When the stock sheet is cut and scored as shown in FIG. 12, the blanks VIII will appear as shown in FIGS. 13 and 14.

In the blank pattern illustrated in FIG. 12A, each intermediate cut $d$ comprises a main intermediate cut 133 extending diagonally to the longitudinal scores 103 and 104 and is joined to the terminal ends $c$ of the paired transverse cuts $b$ by substantially parallel and longitudinally extending cuts 133' which may be substantially in alignment with adjacent rear panel and top panel connecting score 104 of the adjacent reversely arranged blanks IX. The tapered end margin 33 of the rear end flap 8 may be substantially in alignment with the tapered end marginal portion 34 of the adjacent bottom end flap 7. Each connecting cut 133' defines the top edge 33' of the rear end flap 8 and also a vertical marginal portion 34' of adjacent bottom end flap 7 of the adjacent blank. The remaining marginal edge portion 34" of the bottom end flap 7 is defined by the adjacent transverse cut $b$ so that a part of each bottom end flap 7 is substantially the same length as the adjacent front end flap 6 whose end margin 6'—6" is also defined by the adjacent transverse cut $b$—$b'$. The bottom edge 13 of each front end flap 6 is defined entirely by the segmental cut 110 which extends substantially in alignment with the front panel and bottom panel connecting score 102. When the blank IX is erected into carton form, it will appear substantially as shown in FIG. 16A.

In the blank pattern illustrated in FIG. 12B, each intermediate cut $d$ comprises a single intermediate cut 135 which may extend substantially in a straight line between the terminal ends $c$ of the paired longitudinally spaced transverse cuts $b$. The two bottom end flaps 8 of adjacent reversely arranged blanks X are thus substantially triangular in shape, and present a tapered edge margin 35 which is substantially in alignment with a tapered marginal end portion 36 of the adjacent bottom end flap 7. The remaining marginal edge portion 36' of each bottom end flap 7 is defined by the adjacent transverse cut *b* so that a part of each bottom end flap 7 is substantially the same length as the adjacent front end flap 6 whose edge margin 6'—6" is defined entirely by the adjacent marginal cut *b—b'*. When the blank X, patterned as shown in FIG. 12B, is assembled into carton form, it will appear substantially as shown in FIG. 16B.

In the blank pattern illustrated in FIG. 12C, each intermediate cut *d* comprises a main cut section 137 which is joined to the inner ends *c* of the paired transverse cuts *b* by generally Z-shaped connecting cuts 137'. Each bottom end flap 8 as thus defined presents an end marginal portion 37 and a top margin 37' which may extend substantially in alignment with the rear panel and top panel connecting score 104. Each rear end flap 8 of the blank XI patterned as shown in FIG. 12C also present a vertical marginal portion 37" which may be substantially in alignment with the segmental cut 109 which extends substantially in alignment with the bottom and rear panel connecting score 103 of the adjacent reversely arranged blank, with a supplemental end margin portion 37''' defined by the main cut section 137 of the intermediate cut. It may be noted by referring to FIG. 12C that a part of each rear end flap 8 is taken from the adjacent bottom end flap 7 of the adjacent reversely arranged blank so that the Z-shaped connecting cut 137' defines an end marginal portion 38, a vertical marginal portion 38' and a rear marginal portion 38" of adjacent bottom end flap 7, of the adjacent reversely arranged blank XI. The remaining end marginal portion 38''' of the bottom end flap 8 of the blank XI is defined by the adjacent transverse cut *b*. Thus the blank XI patterned as illustrated in FIG. 12C may present bottom end flaps 7 which for the major part have a width substantially equal to the width of the bottom panel 2 and a height substantially equal to the height of the front panel 1 and when assembled into carton form may appear substantially as shown in FIG. 16C. The opening adjacent to the top edge of the end walls of the carton shown in FIG. 16C may be substantially reduced or eliminated by making the width of the front and rear panels 1 and 3 somewhat greater in relation to the width of the bottom panel 2, than that shown in the blank pattern of FIG. 12C.

The blank patterns shown in FIGS. 12, 12A, 12B and 12C illustrate only some of the numerous configurations which the intermediate cuts *d* may assume to provide bottom end flaps and rear end flaps of various shapes and contours. All of these blanks may be assembled on standard carton assembly equipment. In assembling blanks VIII patterned as shown in FIG. 12, a patch *r* of adhesive may be applied to the inside face of the rear end flaps 8, and a patch of adhesive *s* may also be applied to the inside face of the front end flap 6 as shown in FIG. 13. In assembling the blanks VIII as shown in FIG. 13, the front and rear panels 1 and 3 and the bottom end flaps 7 are upturned, the front end flaps 6 then inturned and pressed into secured relation to the adjacent upturned bottom end flaps 7, and the glued rear end flaps 8 then inturned and pressed into adhered relation to the outside face of the adjacent front end flaps 6 to provide an erect carton as shown in FIG. 15. Alternatively, a patch *s* of adhesive may be applied to the inside face of the front end flaps 6 only, as shown in FIG. 14. The front and rear panels 1 and 3 may then be erected, the bottom flaps 7 upturned, the rear end flaps 8 inturned and pressed into adhesively secured relation to the adjacent upturned bottom end flaps 7, and the front end flaps 6 then inturned and pressed into adhesively secured relation to the outside faces of the adjacent bottom end flaps 7 and rear end flaps 8 to produce the erected carton as shown in FIG. 16.

By following the assembly procedures above described and illustrated in FIGS. 13, 14, 15 and 16, the blank IX, X and XI when patterned as shown in FIGS. 12A, 12B and 12C may be similarly assembled into the carton forms illustrated in FIGS. 16A, 16B and 16C. In the carton forms shown in FIGS. 16A and 16B, the end walls thereof are formed by the adhesively secured front end flaps 6 and rear end flaps 8, with a longitudinal edge 16 of the front end flaps 6 substantially defining the top edges of the end walls. The rear end flaps 8 may be secured to the outside face of the adjacent front end flaps 6, or they may be alternatively secured to the inside face of the front end flaps 6, the bottom end flaps 7 then serving to close the bottom ends of the carton and, if desired, may remain unsecured. In the carton form illustrated in FIG. 16C, whose height is substantially less than its width, the end walls of the carton may in the main be provided by the bottom end flaps 7 and only incrementally supplemented by the upper portion of the rear end flaps 8. The front end flaps 6 and the rear end flaps then mainly provide innerliners for the end walls. It will thus be appreciated that cartons having front and rear panels 1 and 3 of greater height than the width of the bottom panels 1, as well as cartons whose front and rear panels 1 and 3 have a height substantially equal to the width of the bottom panel 2, and also cartons whose front and rear panels 1 and 3 have a height less than the width of the bottom panel 2, may be formed in accordance with this invention from blanks whose cutting and scoring patterns may be correspondingly varied as above described.

Hinged cover tuck-flap cartons may also be made in accordance with this invention which are provided with dust flaps as well as a cover panel sealing flap and which may be made from blanks whose scoring and cutting patterns result in no waste of stock sheet material between the boundaries of adjacent blanks. As illustrative of such blank forms, FIG. 17 shows a stock sheet scoring and cutting pattern wherein the total width of the front panel 1 of the formed blanks XII is sufficiently greater than the width of the rear panel 3 to provide for dust flaps in association with the front end flaps 6, and to provide for a sealing flap section in association with the front panel 1. The paired transverse cuts *b—b'* are longitudinally spaced so that the front end flaps 6 when glued to the rear end flaps 8 provide the end walls for the carton, with the longitudinal side edges 16 of the front end flaps 6 forming the free edges of the dust flap sections, and with the longitudinal edge 10 of the front panel 1 forming the free edge of the sealing flap section associated therewith. The paired and longitudinally spaced transverse cuts *b—b'* define the tapered end edges 5' of the tuck flap 5 and the end margins 4' of the top panel 4, and also define all, or at least a part of, the end margin 6'—6" of the adjacent front end flaps 6 of the adjacent reversely arranged blank XII.

The inner terminal ends *c* of the paired transverse cuts *b* are connected by an intermediate cut *d* which may have various configurations as previously described. As illustrative only, the intermediate cut *d* of the blank XII patterned as shown in FIG. 17 present a main intermediate cut 140 which extends substantially at right angles to the longitudinal scores 102, 103 and 104 and is substantially equidistantly spaced between the transverse scores 107 and 108 of adjacent blanks XII so that the adjacent bottom and rear end flaps 7 and 8 have substantially the same length, with the end margins 40 of the rear end flap 8 and the end margin 41 of the adjacent bottom end flap 7 substantially in alignment. The main intermediate cut 140 of the blank pattern shown in FIG. 17 is joined to the terminal ends *c* of the paired transverse cuts *b* by substantially parallel cuts 140' which may extend diagonally to define a tapered top edge 40' for the rear end flap 8 and a biased end edge portion 42 for the front end flap 6 of the adjacent reversely arranged blank. The adjacent bottom and rear end flaps 7 and 8 of each blank XII are separated by the segmental cut 109 which preferably extends substantially in alignment with the bottom panel and rear panel connecting score 103, and the bottom end flap 7 is separated from the bottom edge 13 of the adjacent bottom end flap 6 by the segmental cut 110 which preferably extends substantially in alignment with the front panel and bottom panel connecting score 102. It will be appreciated, however, that the intermediate cuts d may have other shapes and configurations from that shown in FIG. 17 to provide rear end flaps 8 and bottom end flaps 7 of varying shapes and forms as may be partly determined by the length and longitudinal spacing of the paired transverse cuts b—b'.

The front panel 1 is provided with a longitudinally extending score 141 which may be weakened by spaced perforations to divide the front panel 1 into a front end panel section 43 whose width is substantially equal to the width of the rear panel 3 as defined between the longitudinally extending scores 103 and 104, the remaining portion of the front panel 1 providing a sealing flap section 43' which may be of any desired width. The longitudinal weakened score 141 extends substantially parallel to the free side edge 10 of the front panel 1, and the sealing flap section 141' is separated from the adjacent front end flaps 6 by segmental cuts 142 which are substantially in alignment with adjacent transverse scores 106.

Dust flaps forming a part of the front end flaps 6 are provided by dividing each front end flap by a longitudinally extending score 143 into an end wall section 44 and a dust flap section 44', the longitudinal scores 143 associated with the front end flaps 6 being substantially in alignment with the longitudinal weakened score 141 formed in the front panel 1. The ear portions 9 thus become associated with the end of each dust flap section 44'.

In assembling the blanks XII into carton form, adhesive patches r may be applied to the inside face of the rear end flaps 8 as shown in FIG. 18 and the blank assembled into carton form by upholding the front and rear panels 1 and 3 and the bottom end flaps 7, infolding the front end flaps 6, and thereupon infolding the rear end flaps 8 and pressing same into adhesive securement to the outside face of the inturned front end flaps 6, providing an erected carton as shown in FIG. 20. Alternatively, the blanks XII may be assembled into carton form by applying adhesive patches s to the end wall forming sections 44 of the front end flaps 6 as shown in FIG. 19 and thereupon upfolding the front and rear panels 1 and 3 and the bottom end flaps 7, infolding the rear end flaps 8, and then infolding the front end flaps 6 and pressing the same into adhesive securement with the adjacent bottom end flaps 7 and rear end flaps 8 to provide an erected carton as shown in FIG. 21.

In packaging and sealing the erected cartons shown in FIGS. 20 and 21, the erected carton body is first filled with merchandise contents, and an adhesive layer t applied to the inside face of the previously outfolded sealing flap section 43'. Substantially simultaneously, or prior to the application of adhesive layer t, the dust flap sections 44' are inturned, the cover top panel swung to closed position, and the tuck flap 5 inserted into the carton, and thereupon the sealing flap section 43' may be folded to overlie the front portion of the top panel and pressed into adhesive securement thereto, providing a filled and sealed carton as shown in FIG. 22. The customer may thereafter obtain initial access to the contents by breaking the weakened longitudinally extending score 141 so that the cover top panel 4 may be swung into open position as shown in FIG. 23. This carton may be subsequently reclosed by inserting the tuck flap 5 into the carton, and the contents thereafter protected from dust and contamination by the closed cover top panel 4 and the dust flap sections 44' which extend inwardly from the end walls of the carton. The ear portions 9 associated with the dust flap sections 44' do not detract from the appearance of the carton, or impair the serviceability of the dust flap sections 44'.

Hinged cover tuck-flap cartons having dust flaps associated with the bottom end flaps thereof may be formed from one-piece blanks in accordance with this invention without resultant waste of paperboard material between the boundaries of adjacent blanks as cut from the stock sheet. These blanks may be patterned to provide cartons having front and rear panels 1 and 3 of less height than the width of the bottom panel 2 by following the scoring and cutting pattern as exemplified in FIG. 17A, and wherein the formed blanks XIII present front and rear panels 1 and 3 of substantially less width than the bottom and top panels 2 and 4. The paired transverse cuts b—b' are sufficiently spaced longitudinally of the columnar strip 100 so that the bottom end flaps 7 have a length which is greater than the width of the front panel 1 to provide the requisite dust flap section in association therewith.

In the scoring and cutting pattern as shown in FIG. 17A, each transverse cut b—b' defines the adjacent end margins 4'—5' of the top panel 4 and associated tuck flap 5, and also defines the end margin 6'—6" of the adjacent front end flap 6 and a major part of the end margin 45 of the adjacent bottom end flap 7 of the adjacent reversely arranged blank XIII. The inner terminal ends c of the paired transverse cuts b—b' extend to the terminal end of the adjacent rear panel and top panel connecting score 104, and the terminal ends c are joined by the intermediate single line cut d which may be of varying configuration in accordance with dimensional attributes of the blanks to be cut from the columnar strip.

In the blank patterns shown in FIG. 17A, the intermediate cut d comprises an intermediate cut section 145 which is joined to the terminal ends c of the paired transverse cuts b by generally Z-shaped connecting cuts or by obtuse angular cuts 145'. Each rear end flap 8 is separated from the adjacent bottom end flap 7 by the segmental cut 109 which preferably extends substantially in alignment with the bottom panel and rear panel connecting score 103. The intermediate cut section 145 may extend substantially parallel to and equidistantly between the transverse scores 108 which define the adjacent ends of the rear panels 3 of adjacent reversely arranged blanks XIII. The intermediate cut segment 145 thus defines an end marginal portion 46 of the adjacent rear end flap 8, while the connecting cut 145' defines a vertical edge margin 46' and a diagonally extending end margin 46" of the adjacent rear end flap 8. A leg portion of the connecting cut 145' is substantially in alignment with the adjacent segmental cut 109 and together they define the rear edge 45' of the bottom end flap 7, while the diagonally extending portion of the connecting cut 145' defines a tapered rear edge portion 45" of the adjacent bottom end flap 7.

A transverse score 146 which is substantially parallel to the adjacent transverse score 107 divides each bottom end flap 7 into an end wall section 47 and a dust flap section 47'. Each transverse score 146 is so spaced from adjacent transverse score 107 as to provide an end wall section 47 whose length is substantially equal to the width of the front panel 1 so that each end wall section 47 provides a full height and full width end wall for the carton.

The blank XIII may be assembled into carton form by erecting the front and rear panels 1 and 3, infolding the front end flaps 6 and the rear end flaps 8, and then upfolding the bottom end flaps 7 and securing the end wall section 47 thereof as by adhesive to the outside faces of the inturned front and rear end flaps 6 and 8, thereby producing an erected carton as shown in FIG. 20A. Cartons formed from blanks cut and scored as generally illustrated in the blank pattern of FIG. 17A, may have front and rear panels 1 and 3 of almost any height which is less than the width of the bottom panel 2. It will be noted that the rear end flaps 8 are partly recovered by tapering the adjacent end of the dust flap section 47' which is adjacent to the rear panel 3, to thereby provide full height and full width end wall sections 47. Hinged cover tuck-flap cartons as thus formed are attractive in appearance, strong in construction, and are provided with dust flap sections 47' which are foldably connected by the scores 146 to the upper ends of the end wall sections 47 for the full width thereof.

In all of the blank scoring and cutting patterns of this invention, it will be appreciated that the substantially aligned transverse scores 106, 107 and 108 which define the ends of the front, bottom and rear wall panels may be incrementally offset with respect to each other in accordance with the thickness of the stock sheet material to thereby facilitate infolding of the front end flap 6, bottom end flap 7 and rear end flaps 8 in any desired superimposed relation. Such incremental offsetting of the transverse scores 106, 107 or 108 with respect to each other in no way impairs the snug interfit between the end margins of adjacent blanks when the side edges of the blanks in the columnar row are in alignment so that no stock sheet waste results.

The ear portions 9 which extend from the marginal ends of the front end flaps 6 of all blank forms are confined within the rectangular outline of the cartons assembled therefrom, and are in most cases either overlapped by the adjacent rear end flap 8 or the bottom end flap 7, or are otherwise incorporated into the rear end of the dust flap section. Hinged cover tuck-flap carton forming blanks may be made in accordance with this invention to provide cartons of any desired width and height as well as length, and may also be provided with dust flap sections associated with the end walls and also a sealing flap section associated with the front panel as may be selectively desired.

By following the teachings of this invention, hinged cover tuck-flap cartons of rectangular cross section, and provided with tuck flaps designed for convenient insertion within the assembled carton adjacent to the inside face of the front panel thereof, and with or without dust flap sections and sealing flap sections, can be produced at substantially less cost than cartons of like type as heretofore produced. These savings are reflected from the substantial savings effected in producing the blanks from which the cartons are made, since the blanks may be scored and cut from imprinted stock sheets or stock rolls with no stock sheet waste being produced between the marginal boundaries of the adjacent blanks, which permits operation of the cutting and scoring machine at higher speeds than heretofore considered possible, which requires no hand or mechanical stripping of waste materials between the marginal boundaries of adjacent blanks, and wherein the side trimming of the stock sheet or stock rolls can be strictly limited to the removal of damaged side edge portions only.

Hinged cover tuck-flap cartons can be assembled from blanks made in accordance with this invention on standard carton assembly equipment. The cartons produced from these blanks are strong in construction, attractive in appearance and serviceable in the packaging of numerous different types of products and merchandise normally packaged in hinged cover tuck-flap cartons. For example, cigarette packs p can be advantageously packaged in cartons made from appropriately dimensioned blanks made in accordance with this invention so that state tax stamps ts may be applied by high speed machine operation to the ends of the packs residing in the carton when the cover top panel 4 is opened as shown in FIGS. 4, 5, 10 and 11, and which permits the reclosing of the cover top panel as shown in FIG. 6 without requiring laceration of the carton during the stamp applying operation.

While certain novel features of this invention have been disclosed herein and are pointed out in the claims, it will be understood that various omissions, substitutions and changes may be made by those skilled in the art without departing from the spirit of this invention.

What is claimed is:

1. A one-piece hinged cover carton forming blank whose opposite end edges are designed to completely interfit, in snug cut-line contact throughout the transverse width of the blank, with the opposite end edges of two identical blanks when the three blanks are alternately arranged in columnar alignment, said blank presenting a front panel, a bottom panel, a rear panel, a top panel and a tuck-in flap foldably connected by substantially parallel longitudinally extending scores and serially arranged in the order named, said tuck-in flap presenting tapered end edges contoured to facilitate insertion of the tuck-in flap into the assembled carton, and an end flap foldably connected by a transverse score to each end of each of said front, bottom and rear panels, each of said front end flaps having an ear portion projecting from the end edge thereof whose free end edge is contoured in reverse conformity to the contour of the tapered end edges of said tuck-in flap, each of said front end flaps being separated from the adjacent bottom end flap by a slit cut extending substantially in alignment with the front and bottom panel connecting score, and each of said bottom end flaps being separated from the adjacent rear end flap by a slit cut extending substantially in alignment with the bottom and rear panel connecting score whereby each of said rear end flaps presents a square cut bottom edge, the free longitudinal edge of said front panel being substantially in alignment with the free longitudinal edges of said front end flaps and extending substantially in parallelism with the free longitudinal edge of said tuck-in flap, each of said front end flaps having a transverse width throughout the length thereof which is not greater than the transverse width of said front panel.

2. A one-piece hinged cover tuck flap carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel and longitudinally extending scores and serially arranged in the order named, end flaps extending from both ends of the front, bottom and rear panels of the blank, said tuck-in flap presenting tapered end edges contoured to facilitate insertion of the tuck-in flap into the assembled carton, each of said front end flaps having an ear portion projecting from the end edge thereof whose free end edge is contoured in reverse conformity to the contour of the tapered end edges of said tuck-in flap, each of said front end flaps having a free longitudinal edge which is substantially equal to the width of said bottom panel and a transverse width throughout the longitudinal length thereof which is not greater than the transverse width of said front panel, the adjacent front and bottom end flaps being separated by a segmental cut extending substantially in alignment with the front and bottom panel connecting score, the adjacent bottom and rear end flaps being separated by a segmental cut extending substantially in alignment with the bottom and rear panel connecting score whereby each of said rear end flaps presents a square cut bottom edge, the free longitudinal edge of said front panel and the free longitudinal edges of said front end flaps being substantially in alignment with each other and extending substantially in parallelism with the free longitudinal edge of said tuck flap, said blank having similar end contours formed by a pair of inner margins which define the outer end edges of the top panel and tuck flap, a pair of outer margins, and a pair of intermediate margins joining the inner terminal ends of said outer and inner end margins, said outer margins and intermediate margins together defining the outer edges of adjacent front, bottom and rear end flaps, said inner margins extending from the longitudinal side edge of the tuck flap in flared relation to define the tapered end edges of the tuck flap and thence extend in substantially parallel relation to terminate adjacent the rear and top panel connecting score, said outer margins extending from the longitudinal edges of the front end flaps and being substantially equal in length to the length of said inner margins and contoured in reverse conformity to the contour of said inner margins, the adjacent front, bottom and rear end flaps being defined by transverse scores which are substantially in alignment with each other and substantially in alignment with the adjacent end edge of the top panel to thereby provide front, bottom, rear and top panels of substantially equal length, the outer and intermediate margins and said transverse scores defining similar front, bottom and rear end flaps at opposite ends of the blank.

3. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel longitudinally extending scores and serially arranged in the order named, said front panel having a uniform transverse width throughout the length thereof which is greater than the transverse width of said bottom panel, a pair of similar end flaps foldably connected by substantially parallel transverse scores to the opposite ends of said front panel, a pair of similar end flaps foldably connected by substantially parallel transverse scores to the opposite ends of said bottom panel, and a pair of similar end flaps foldably connected by substantially parallel transverse scores to the ends of said rear panel, said tuck-in flap presenting tapered end edges contoured to facilitate insertion of the tuck-in flap into the assembled carton, each of said front end flaps having an ear portion projecting from the end edge thereof whose free end edge is contoured in reverse conformity to the contour of the tapered end edges of said tuck-in flap, each of said front end flaps having a free longitudinal edge which is substantially equal to the width of said bottom panel and a transverse width throughout the longitudinal length thereof which is not greater than the transverse width of said front panel, each of said front end flaps being separated from the adjacent bottom end flap by a slit cut extending substantially in alignment with the front and bottom panel connecting score, each of said bottom end flaps being separated from the adjacent rear end flap by a slit cut extending substantially in alignment with the bottom and rear panel connecting score whereby each of said rear end flaps presents a square cut bottom edge, the marginal ends of the adjacent end flaps at each end of the blank being defined by an outer edge margin contoured in reverse conformity to the adjacent end edge of said top panel and tuck flap and having a transverse length which is substantially equal to the combined transverse length of the adjacent end edge of the top panel and tuck flap, a substantially straight intermediate edge margin extending intermediately between the adjacent outer edge margin and the terminal end edge of the top panel, and a pair of connecting margins one of which extends from the end edge of the top panel to said intermediate edge margin and the other extends from said intermediate edge margin to said outer edge margin.

4. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel longitudinally extending scores and serially arranged in the order named, said front panel having a uniform transverse width throughout the length thereof which is greater than the transverse width of said bottom panel, said tuck flap presenting similar tapered end edges contoured to facilitate insertion of the tuck flap into the assembled carton, a pair of similar end flaps foldably connected by substantially parallel transverse scores to the opposite ends of said front panel, a pair of similar end flaps foldably connected by substantially parallel transverse scores to the opposite ends of said bottom panel, and a pair of similar end flaps foldably connected by substantially parallel transverse scores to the ends of said rear panel, each of said front end flaps being separated from the adjacent bottom end flap by a slit cut extending substantially in alignment with the front and bottom panel connecting score, each of said bottom end flaps being separated from the adjacent rear end flap by a slit cut extending substantially in alignment with the bottom and rear panel connecting score whereby each of said rear end flaps presents a square cut bottom edge, each of said front end flaps having an ear portion projecting from the end edge thereof whose free end edge is contoured in reverse conformity to the contour of the tapered end edges of said tuck flap, each of said front end flaps having a free longitudinal edge which is substantially equal to the width of said bottom panel and a transverse width throughout the longitudinal length thereof which is not greater than the transverse width of said front panel, the marginal ends of said end flaps being defined by outer margins substantially equal to the combined length of the end edge of said top panel and substantially straight tuck flap, and intermediate edge margins extending intermediately between said outer end margins and the adjacent end edge of the top panel, and a pair of connecting margins at each end of the blank one of which extends from the end edge of the top panel to the adjacent intermediate edge margin and the other extends from said intermediate edge margin to said outer edge margin, the free longitudinal edge of said front panel being substantially in alignment with the free longitudinal edges of said front end flaps and extending substantially in parallelism with the free longitudinal edge of said tuck flap.

5. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel longitudinally extending scores and serially arranged in the order named, said front panel having a uniform transverse width throughout the length thereof which is greater than the transverse width of said bottom panel, a pair of similar end flaps foldably connected by substantially parallel transverse scores to the opposite ends of said front panel, a pair of similar end flaps foldably connected by substantially parallel transverse scores to the opposite ends of said bottom panel, and a pair of similar end flaps foldably connected by substantially parallel transverse scores to the ends of said rear panel, said tuck-in flap presenting tapered end edges contoured to facilitate insertion of the tuck-in flap into the assembled carton, each of said front end flaps having an ear portion projecting from the end edge thereof whose free end edge is contoured in reverse conformity to the contour of the tapered end edges of said tuck-in flap, each of said front end flaps being separated from the adjacent bottom end flap by a slit cut extending substantially in alignment with the front and bottom panel connecting score, each of said bottom end flaps being separated from the adjacent rear end flap by a slit cut extending substantially in alignment with the bottom and rear panel connecting score whereby each of said rear end flaps presents a square cut bottom edge, the marginal ends of said end flaps at each end of the blank being defined by an outer edge margin contoured in reverse conformity to the adjacent end edge of said top panel and tuck flap and whose transverse length is substantially equal to the combined transverse length of the end edge of the top panel and tuck flap, a substantially straight intermediate edge margin extending intermediately between the adjacent outer edge margin and the adjacent end edge of the top panel, and a pair of substantially parallel and similar connecting margins one of which extends from said intermediate edge margin to the adjacent end of the rear panel and top panel connecting score and the other extends from said intermediate edge margin to said outer edge margin, the free longitudinal edge of said front panel being substantially in alignment with the free longitudinal edges of said front end flaps and extending substantially in parallelism with the free longitudinal edge of said tuck flap, the free longitudinal edge of each of said front end flaps having a length not greater than the transverse width of the bottom panel, each of said front end flaps and the adjacent rear end flap having a combined longitudinal length throughout the transverse width thereof which is greater than the transverse width of the bottom panel whereby said front and rear end flaps may be secured together in overlapped relation for the full length thereof to provide the end wall for the assembled carton.

6. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel longitudinally extending scores and serially arranged in the order named, a pair of similar end flaps foldably connected by substantially parallel transverse scores to the opposite ends of said front panel, a pair of similar end flaps foldably connected by substantially parallel transverse scores to the opposite ends of said bottom panel, and a pair of similar end flaps foldably connected by substantially parallel transverse scores to the ends of said rear panel, said tuck-in flap presenting tapered end edges contoured to facilitate insertion of the tuck-in flap into the assembled carton, each of said front end flaps having an ear portion projecting from the end edge thereof whose free end edge is contoured in reverse conformity to the contour of the tapered end edges of said tuck-in flap, each of said front end flaps having a transverse width throughout the longitudinal length thereof which is not greater than the transverse width of said front panel, each of said front end flaps being separated from the adjacent bottom end flap by a slit cut extending substantially in alignment with the front and bottom panel connecting score, each of said bottom end flaps being separated from the adjacent rear end flap by a slit cut extending substantially in alignment with the bottom and rear panel connecting score whereby each of said rear end flaps presents a square cut bottom edge, the marginal ends of said end flaps at each end of the blank being defined by an outer edge margin contoured in reverse conformity to the adjacent end edge of said top panel and tuck flap and whose transverse length is equal to the combined transverse length of the end edge of the top panel and tuck flap, a substantially straight intermediate edge margin extending midway between the adjacent outer edge margin and the adjacent end edge of the top panel, and a pair of substantially parallel connecting margins one of which extends from the terminal end of the rear panel and top panel connecting score and the other extends from the terminal end of said outer end margin and is located between the longitudinal slit cuts which define the bottom end flap, the free longitudinal edge of said front panel being substantially in alignment with the free longitudinal edges of said front end flaps and extending substantially in parallelism with the free longitudinal edge of said tuck flap, the free longitudinal edge of each of said front end flaps having a length not greater than the transverse width of the bottom panel, each of said front end flaps and the adjacent rear end flap having a combined longitudinal length throughout the transverse width thereof which is greater than the transverse width of the bottom panel whereby said front and rear end flaps may be secured together in overlapped relation for the full length thereof to provide the end wall for the assembled carton.

7. A one-piece hinged cover tuck flap carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel and longitudinally extending scores and serially arranged in the order named, said front panel having a uniform transverse width throughout the length thereof which is greater than the transverse width of said bottom panel, end flaps extending from both ends of the front, bottom and rear panels of the blank, the adjacent front, bottom and rear end flaps being separated by slit cuts extending substantially longitudinally of the blank, said tuck-in flap presenting tapered end edges contoured to facilitate insertion of the tuck-in flap into the assembled carton, each of said front end flaps having an ear portion projecting from the end edge thereof whose free end edge is contoured in reverse conformity to the contour of the tapered end edges of said tuck-in flap, each of said front end flaps having a free longitudinal edge which is substantially equal to the width of said bottom panel and a transverse width throughout the longitudinal length thereof which is not greater than the transverse width of said front panel, the free longitudinal edge of said front panel and the free longitudinal edges of said front end flaps being substantially in alignment with each other and extending substantially in parallelism with the free longitudinal edge of said tuck flap, said blank having similar end contours formed by a pair of inner margins which define the outer end edges of the top panel and tuck flap, a pair of outer margins, and a pair of intermediate margins joining the inner terminal ends of said outer and inner margins, said outer margins and intermediate margins together defining the outer edges of adjacent front, bottom and rear end flaps, said inner margins extending from the longitudinal side edge of the tuck flap in flared relation to define the tapered end edges of the tuck flap and thence extend in substantially parallel relation and terminate adjacent the terminal end of the rear and top panel connecting score, said outer margins extending from the longitudinal edges of the front end flaps and being substantially equal in length to the length of said inner margins and contoured in reverse conformity to the contour of said inner margins, the adjacent front, bottom and rear end flaps being defined by transverse scores which are substantially in alignment with each other and substantially in alignment with the adjacent end edge of the top panel to thereby provide front, bottom, rear and top panels of substantially equal length, said front panel having a longitudinally extending score defining a front panel section and a sealing flap section, each of said front end flaps having a longitudinally extending score defining an end panel section and a dust flap section, each of said dust flap sections being separated from the adjacent ends of said sealing flap section by a transversely extending slit cut.

8. One-piece hinged cover tuck flap carton forming blanks of identical shape and area having end edges designed to snugly and completely interfit when alternate blanks are reversely arranged in columnar alignment, each of said blanks presenting a front panel, a bottom panel, a rear panel, a top panel and a tuck flap foldably connected by substantially parallel and longitudinally extending scores and serially arranged in the order named, said tuck flap presenting tapered end edges merging into the substantially parallel extending end edges of the top panel, similar end flaps extending from the ends of the front panel, similar end flaps extending from the ends of the bottom panel and similar end flaps extending from the ends of the rear panel, each of said front end flaps having a transverse width throughout the longitudinal length thereof which is not greater than the transverse width of said front panel, the adjacent front, bottom and rear end flaps being separated by slit cuts extending substantially parallel to each other and in substantial parallelism with said panel connecting scores whereby each of said rear end flaps presents a square cut bottom edge, the free longitudinal edge of said front panel and the free longitudinal edges of said front end flaps being substantially in alignment with each other and extending substantially in parallelism with the free longitudinal edge of said tuck flap, the free end edges of adjacent front end flaps, bottom end flaps, rear end flaps, top panel and tuck flap of one blank being shaped to reversely and completely interfit with the free end edges of the adjacent tuck flap, top panel, rear end flap, bottom end flap and front end flap of an adjacent blank when the opposite side edges of said blanks are in alignment.

9. One-piece hinged cover tuck flap carton forming blanks of identical shape and area having end edges designed to snugly and completely interfit when alternate blanks are reversely arranged in columnar alignment, each of said blanks presenting a front panel, a bottom panel, a rear panel, a top panel and a tuck flap foldably connected by substantially parallel and longitudinally extending scores and serially arranged in the order named, said tuck flap presenting tapered end edges merging into the substantially parallel extending end edges of the top panel, similar end flaps extending from the ends of the front panel, similar end flaps extending from the ends of the bottom panel and similar end flaps extending from the ends of the rear panel, each of said front end flaps having a longitudinal edge which is substantially equal to the width of said bottom panel and a transverse width throughout the longitudinal length thereof which is not greater than the transverse width of said front panel, the adjacent front and bottom end flaps being separated by a slit cut extending substantially in alignment with the front and bottom panel connecting score and the adjacent bottom and rear end flaps being separated by a slit cut extending substantially in alignment with the bottom and rear panel connecting score whereby each of said rear end flaps presents a square cut bottom edge, the free end edges of adjacent front end flaps, bottom end flaps, rear end flaps, top panel and tuck flap of one blank being shaped to reversely and completely interfit with the free end edges of the adjacent tuck flap, top panel, rear end flap, bottom end flap and front end flap of an adjacent blank when the opposite side edges of said blanks are in alignment.

10. One-piece hinged cover tuck flap carton forming blanks of identical shape and area having end edges designed to snugly and completely interfit when alternate blanks are reversely arranged in columnar alignment, each of said blanks presenting a front panel, a bottom panel, a rear panel, a top panel and a tuck flap foldably connected by substantially parallel and longitudinally extending scores and serially arranged in the order named, said front panel having a uniform transverse width throughout the length thereof which is greater than the transverse width of said bottom panel, said tuck flap presenting tapered end edges merging into the substantially parallel extending end edges of the top panel, similar end flaps extending from the ends of the front panel, similar end flaps extending from the ends of the bottom panel and similar end flaps extending from the ends of the rear panel, each of said front end flaps having a longitudinal edge which is substantially equal to the width of said bottom panel and a transverse width throughout the longitudinal length thereof which is not greater than the transverse width of said front panel, the adjacent front and bottom end flaps being separated by a slit cut extending from the terminal end of the front and bottom panel connecting score and the adjacent bottom and rear end flaps being separated by a slit cut extending from the terminal end of the bottom and rear panel connecting score and in substantial alignment therewith whereby each of said rear end flaps presents a square cut bottom edge, the free longitudinal edge of said front panel and the free longitudinal edges of said front end flaps being substantially in alignment with each other and extending substantially in parallelism with the free longitudinal edge of said tuck flap, the free longitudinal edge of each of said front end flaps having a length not greater than the transverse width of the bottom panel, each of said front end flaps and the adjacent rear end flap having a combined longitudinal length throughout the transverse width thereof which is greater than the transverse width of the bottom panel whereby said front and rear end flaps may be secured together in overlapped relation for the full length thereof to provide the end wall for the assembled carton, the free end edges of adjacent front end flaps, bottom end flaps, rear end flaps, top panel and tuck flap of one blank being shaped to reversely and completely interfit with the free end edges of the adjacent tuck flap, top panel, rear end flap, bottom end flap and front end flap of an adjacent blank when the opposite side edges of said blanks are in alignment.

11. One-piece hinged cover tuck flap carton forming blanks of identical shape and area having end edges designed to snugly and completely interfit when alternate blanks are reversely arranged in columnar alignment, each of said blanks presenting a front panel, a bottom panel, a rear panel, a top panel and a tuck flap foldably connected by a substantially parallel and longitudinally extending scores and serially arranged in the order named, said front panel having a uniform transverse width throughout the length thereof which is greater than the transverse width of said bottom panel, said tuck flap presenting tapered end edges merging into the substantially parallel extending end edges of the top panel, similar end flaps extending from the ends of the front panel, similar end flaps extending from the ends of the bottom panel and similar end flaps extending from the ends of the rear panel, each of said front end flaps having a free longitudinal edge which is substantially equal to the width of said bottom panel and a transverse width throughout the longitudinal length thereof which is not greater than the transverse width of said front panel, the adjacent front and bottom end flaps being separated by a slit cut extending substantially in alignment with the front and bottom panel connecting score and the adjacent bottom and rear end flaps being separated by a slit cut extending substantially in alignment with the bottom and rear panel connecting score whereby each of said rear end flaps presents a square cut bottom edge, the free longitudinal edge of said front panel and the free longitudinal edges of said front end flaps being substantially in alignment with each other and extending substantially in parallelism with the free longitudinal edge of said tuck flap, the adjacent front, bottom and rear end flaps being defined by transverse scores which are substantially in alignment with each other and substantially in alignment with the adjacent end edge of the top panel to thereby provide front, bottom, rear and top panels of substantially equal length, the free end edges of adjacent front end flaps, bottom end flaps, rear end flaps, top panel and tuck flap of one blank being shaped to reversely and completely interfit with the free end edges of the adjacent tuck flap, top panel, rear end flap, bottom end flap and front end flap of an adjacent blank when the opposite side edges of said blanks are in alignment.

12. One-piece hinged cover carton forming blanks of identical shape and area having end edges designed to snugly and completely interfit when the blanks are alternately arranged in columnar alignment, each of said blanks presenting a bottom panel, a rear panel, a top panel and a tuck flap foldably connected by substantially parallel and longitudinally extending scores and serially arranged in the order named, said front and rear panels having a width less than two-thirds of the width of the bottom panel, said tuck flap presenting tapered end edges contoured to facilitate insertion of the tuck flap into the assembled carton, end flaps foldably connected to the ends of said front, bottom and rear panels along substantially parallel transverse scores, each of said front end flaps having similar ear portions projecting from the end edges thereof whose free end edges are contoured in reverse conformity to the contour of the tapered end edges of said tuck flap, the outer end edge of each front end flap being substantially in alignment with a substantial portion of the outer end edge of the adjacent bottom end flap except for the reversely contoured end edge of the ear portion extending from said front end flap, each of said front end flaps having a transverse width throughout the longitudinal length thereof which is not greater than the transverse width of said front panel, a slit cut extending substantially in alignment with the front and bottom panel connecting score separating the adjacent front and bottom end flaps, a pair of substantially parallel transverse scores extending across said bottom end flaps dividing each of said bottom end flaps into an end panel section and a dust flap section, each of said end panel sections having a width substantially equal to the width of the bottom panel and a length substantially equal to the width of said front and rear panels for the full width thereof, the free end edges of the adjacent front end flap, bottom end flap and rear flap of one blank being shaped to snugly and completely interfit with the free end edges of the tuck flap, top panel, rear flap and bottom flap of a reversely arranged adjacent blank when the opposite side edges of said blanks are in alignment.

13. One-piece hinged cover carton forming blanks of identical shape and area having end edges designed to snugly and completely interfit when the blanks are alternately arranged in columnar alignment, each of said blanks presenting a front panel, a bottom panel, a rear panel, a top panel and a tuck flap foldably connected by substantially parallel and longitudinally extending scores and serially arranged in the order named, said front and rear panels having a width greater than two-thirds of the width of the bottom panel, said front panel having a width greater than the width of the rear panel, said tuck flap presenting tapered end edges contoured to facilitate insertion of the tuck flap into the assembled carton, end flaps foldably connected to the ends of said front, bottom and rear panels along substantially parallel transverse scores, each of said front end flaps having similar ear portions projecting from the end edges thereof whose free end edges are contoured in reverse conformity to the contour of the tapered end edges of said tuck flap, the outer end edges of said front end flaps being substantially parallel to each other except for the reversely contoured end edges of the ear portions extending from said front end flaps, a slit cut extending substantially in alignment with the front and bottom panel connecting score separating the adjacent front and bottom end flaps, each of said bottom end flaps being separated from the adjacent rear end flaps by a slit cut extending substantially in alignment with the bottom and rear panel connecting score whereby each of said rear end flaps presents a square cut bottom edge, and substantially aligned scores extending longitudinally of said front end flaps and said front panel dividing each of said front end flaps into an end panel section and a dust flap section and dividing said front panel into a front panel section and a sealing flap section, each of said end panel sections having a width substantially equal to the width of the front panel section with the front panel section substantially equal in width to said rear panel, the free end edges of the adjacent front end flap, bottom end flap and rear end flap of one blank being shaped to snugly and completely interfit with the free end edges of the tuck flap, top panel, rear flap and bottom flap of a reversely arranged adjacent blank when the opposite side edges of said blanks are in alignment.

14. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel and longitudinally extending scores and serially arranged in the order named, said front and rear panels having a width less than the width of the bottom panel, said tuck flap presenting tapered end edges contoured to facilitate insertion of the tuck flap into the assembled carton, end flaps foldably connected to the ends of said front, bottom and rear panels along substantially parallel transverse scores, each of said front end flaps having similar ear portions projecting from the end edges thereof whose free end edges are contoured in reverse conformity to the contour of the tapered end edges of said tuck flap, each of said front end flaps having a transverse width throughout the longitudinal length thereof which is not greater than the transverse width of said front panel, the outer end edge of each front end flap being substantially in alignment with a substantial portion of the outer end edge of the adjacent bottom end flap except for the reversely contoured end edge of the ear portion extending from said front end flap, a slit cut extending substantially in alignment with the front and bottom panel connecting score separating the adjacent front and bottom end flaps, a pair of substantially parallel transverse scores extending across said bottom end flaps dividing each of said bottom end flaps into an end panel section and a dust flap section, each of said end panel sections having a width substantially equal to the width of the bottom panel and a length substantially equal to the width of said front and rear panels.

15. A one-piece hinged cover carton forming blank whose opposite end edges are designed to completely interfit in snug cut-line contact throughout the transverse width of the blank with the opposite end edges of two identical blanks when the three blanks are alternately arranged in columnar alignment, said blank presenting a front panel, a bottom panel, a rear panel, a top panel and a tuck flap foldably connected by substantially parallel and longitudinally extending scores and serially arranged in the order named, said front and rear panels having a width greater than the width of the bottom panel and said front panel having a width greater than the width of the rear panel, said tuck flap presenting tapered end edges contoured to facilitate insertion of the tuck flap into the assembled carton, end flaps foldably connected to the ends of said front, bottom and rear panels along substantially parallel transverse scores, each of said front end flaps having similar ear portions projecting from the end edges thereof whose free end edges are contoured in reverse conformity to the contour of the tapered end edges of said tuck flap, each of said front end flaps having a transverse width throughout the longitudinal length thereof which is not greater than the transverse width of said front panel, the outer end edges of said front end flaps being substantially parallel to each other except for the reversely contoured end edges of the ear portions extending from said front end flaps, a slit cut extending substantially in alignment with the front and bottom panel connecting score separating the adjacent front and bottom end flaps, and substantially aligned scores extending longitudinally of said front end flaps and said front panel dividing each of said front end flaps into an end panel section and a dust flap section and dividing said front panel into a front panel section and a sealing flap section, each of said end panel sections having a width substantially equal to the width of the front panel section and a length not greater than the width of said panel, said front panel section being substantially equal in width to said rear panel.

16. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front panel having a height substantially equal to the height of said rear panel and said bottom panel having a width substantially equal to the width of said top panel, said front and rear panels having a height greater than two-thirds of the width of said bottom panel, said tuck flap presenting tapered end edges contoured to facilitate insertion of the tuck flap into the carton, end wall flaps foldably connected to the ends of said front, bottom and rear panels, said rear end wall flaps presenting square cut bottom edges extending substantially in the plane of said bottom panel, the adjacent front and rear end flaps being secured together in overlapped relationship for substantially the full height thereof and presenting the top edges thereof substantially in alignment with the top edge of said front panel, each of said front end flaps having a height throughout the length thereof which is not greater than the height of said front panel and having a projecting ear portion adjacent the top edge thereof whose free end edge is contoured in reverse conformity to the tapered end edge of said tuck flap, said free end edge terminating not substantially beyond the outside face of said rear panel.

17. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front and rear panels having a height not substantially less than the width of said bottom panel, said tuck flap presenting tapered end edges contoured to facilitate insertion of the tuck flap into the carton, end wall flaps foldably connected to the ends of said front panel, bottom panel and rear panel, said rear end flaps presenting square cut bottom edges extending substantially in the plane of said bottom panel, the adjacent front and rear end flaps being secured together in overlapping relationship for substantially the full height thereof to provide end walls for the carton, each of said front end flaps having a height throughout the length thereof which is not greater than the height of said front panel and having an inwardly projecting ear portion adjacent the top edge thereof whose free end edge is contoured in reverse conformity to the tapered end edge of said tuck flap, said free end edge terminating not substantially beyond the outside face of said rear panel.

18. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front and rear panels having a height less than two-thirds of the width of said bottom panel, said tuck flap presenting tapered end edges contoured to facilitate insertion of the tuck flap into the carton, end wall flaps foldably connected to the ends of said front panel, bottom panel and rear panel, each of said bottom end flaps presenting a transverse score dividing the bottom end flap into an end panel section and a dust flap section, each of said end panel sections having a height substantially equal to the height of said front and rear panels and a width substantially equal to the width of said bottom panel for the full height thereof, said end panel sections being secured to the adjacent front and rear end flaps to provide end walls for the carton, each of said front end flaps having a height throughout the length thereof which is not greater than the height of said front panel and having an inwardly projecting ear portion adjacent the top edge thereof whose free end edge is contoured in reverse conformity to the tapered end edge of said tuck flap.

19. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front and rear panels having a height greater than the width of said bottom panel, said tuck flap presenting similar tapered end edges contoured to facilitate insertion of the tuck-in flap into the carton, end wall flaps foldably connected to the ends of said front panel, bottom panel and rear panel, said rear end flaps presenting square cut bottom edges extending substantially in the plane of said bottom panel, the adjacent front and rear end flaps being secured together in overlapped relationship for substantially the full height thereof to provide end walls for the carton whose top edges extend substantially in the plane of the top edge of the front and rear panels, each of said front end flaps having a height throughout the length thereof which is not greater than the height of said front panel and having a projecting ear portion adjacent the top edge thereof whose free end edge is contoured in reverse conformity to the tapered end edge of said tuck flap, said free end edge terminating not appreciably beyond said rear panel.

20. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front panel having a height greater than the width of said bottom panel, said tuck flap presenting tapered end edges contoured to facilitate insertion of the tuck flap into the carton, end wall flaps foldably connected to the ends of said front panel, bottom panel and rear panel, said rear end flaps presenting square cut bottom edges extending substantially in the plane of said bottom panel, each of said front end flaps having a height throughout the length thereof which is not greater than the height of said front panel and presenting a longitudinal score dividing the front end flap into an end panel section and a dust flap section, said front panel having a longitudinal score substantially in the plane of the longitudinal score in said front end flaps which divides said front panel into a front panel section and a sealing flap section, said end panel sections having a height substantially equal to the height of said front and rear panels and secured to the adjacent front and rear end flaps for substantially the full height thereof to provide end walls for the carton, each of said dust flap sections having an ear portion adjacent the top edge thereof whose free edge is contoured in reverse conformity to the tapered end edge of said tuck flap.

21. A hinged cover carton formed from a single blank of sheet material which blank has opposite end edges designed to completely interfit, in snug cut-line contact throughout the transverse width of the blank, with the opposite end edges of two identical blanks when the three blanks are alternately arranged in columnar alignment, said carton presenting a front panel, a bottom panel, a rear panel, a top panel and a tuck flap foldably connected by substantially parallel and longitudinally extending scores, said front panel having a height not less than the width of said bottom panel, said tuck flap presenting tapered end edges contoured to facilitate insertion of the tuck flap into the carton, end flaps foldably connected to the ends of said front panel, bottom panel and rear panel, said rear end flaps presenting square cut bottom edges extending substantially in the plane of said bottom panel, said front panel having a longitudinally extending score dividing the front panel into a front panel section and a sealing flap section with the front panel section of substantially the same height as said rear panel section, each of said front end flaps presenting a transverse score dividing the front end flap into an end panel section and a dust flap section, each of said end panel sections having a height substantially equal to the height of said front panel section throughout the length thereof, said end panel sections being secured to the adjacent rear end flaps for substantially the full height thereof to provide end walls for the carton, each of said dust flap sections having an ear portion adjacent the top edge thereof whose free edge is contoured in reverse conformity to the tapered end edge of said tuck flap.

References Cited in the file of this patent

UNITED STATES PATENTS

| | | |
|---|---|---|
| 1,088,570 | Hedden | Feb. 24, 1914 |
| 1,308,883 | Weis | July 8, 1919 |
| 1,926,365 | Bergstein | Sept. 12, 1933 |
| 2,048,729 | Daller | July 28, 1936 |
| 2,367,717 | Davidson | Jan. 23, 1945 |
| 2,429,540 | Woodruff | Oct. 21, 1947 |
| 2,513,079 | Buerger | June 27, 1950 |